United States Patent
Slotwinski et al.

(10) Patent No.: US 10,989,879 B2
(45) Date of Patent: Apr. 27, 2021

(54) THERMALLY COMPENSATED FIBER INTERFEROMETER ASSEMBLY

(71) Applicant: Nikon Metrology NV, Leuven (BE)

(72) Inventors: Anthony R. Slotwinski, Reston, VA (US); Mina A. Rezk, Bristow, VA (US); Pavel Slyusarev, Rockville, MD (US)

(73) Assignee: Nikon Metrology NV, Leuven (BE)

( * ) Notice: Subject to any disclaimer, the term of this patent is extended or adjusted under 35 U.S.C. 154(b) by 725 days.

(21) Appl. No.: 15/316,143

(22) PCT Filed: Jun. 2, 2015

(86) PCT No.: PCT/US2015/033828
§ 371 (c)(1),
(2) Date: Dec. 2, 2016

(87) PCT Pub. No.: WO2016/018508
PCT Pub. Date: Feb. 4, 2016

(65) Prior Publication Data
US 2017/0115455 A1    Apr. 27, 2017

Related U.S. Application Data

(60) Provisional application No. 62/007,262, filed on Jun. 3, 2014.

(51) Int. Cl.
*G02B 6/293* (2006.01)
*G02B 6/02* (2006.01)
(Continued)

(52) U.S. Cl.
CPC .......... *G02B 6/29398* (2013.01); *G01S 7/484* (2013.01); *G01S 7/486* (2013.01); *G02B 6/02395* (2013.01); *G02B 6/29346* (2013.01)

(58) Field of Classification Search
CPC . G02B 6/036; G02B 6/02395; G02B 6/29398
(Continued)

(56) References Cited

U.S. PATENT DOCUMENTS 5,289,256 A    2/1994 Gramling
6,181,852 B1 *  1/2001 Adams ................... G02B 6/022
385/37

(Continued)

FOREIGN PATENT DOCUMENTS

CA     2315006    2/2002
CA     2354752    2/2002
(Continued)

OTHER PUBLICATIONS

International Search Report and Written Opinion from International Application No. PCT/US2015/033828, dated Jun. 21, 2016, 20 pages.
(Continued)

*Primary Examiner* — Yuqing Xiao
*Assistant Examiner* — Amir J Askarian
(74) *Attorney, Agent, or Firm* — Klarquist Sparkman, LLP

(57) ABSTRACT

An optical delay between a first fiber and a second fiber is temperature compensated by combining fibers with different thermal path length changes. In some examples, fibers with different buffer coatings exhibit different path length changes per unit length and temperature. Combining such fibers in a fiber array provides a path length difference that is substantially independent of temperature.

34 Claims, 12 Drawing Sheets

(51) Int. Cl.
*G01S 7/484* (2006.01)
*G01S 7/486* (2020.01)

(58) Field of Classification Search
USPC .............................................. 356/3.01–5.15
See application file for complete search history.

(56) References Cited

U.S. PATENT DOCUMENTS

| | | | | |
|---|---|---|---|---|
| 6,278,821 | B1* | 8/2001 | Carberry | G02B 6/0218 385/123 |
| 6,324,322 | B1* | 11/2001 | Luo | G02B 6/29332 385/39 |
| 6,778,278 | B2 | 8/2004 | Ahmadvand et al. | |
| 9,559,483 | B2* | 1/2017 | Fermann | H01S 3/094019 |
| 2002/0054294 | A1* | 5/2002 | Ahmadvand | G02B 6/29352 356/477 |
| 2003/0053783 | A1 | 3/2003 | Shirasaki | |
| 2003/0086647 | A1* | 5/2003 | Willner | G02B 6/02085 385/37 |
| 2006/0182383 | A1* | 8/2006 | Slotwinski | G01S 7/4818 385/12 |
| 2006/0280415 | A1* | 12/2006 | Slotwinski | G01B 9/02004 385/128 |
| 2009/0323077 | A1* | 12/2009 | Slotwinski | G01B 9/02052 356/482 |
| 2011/0205523 | A1* | 8/2011 | Rezk | G01B 9/02007 356/5.09 |
| 2014/0112361 | A1* | 4/2014 | Njegovec | H01S 5/0612 372/34 |
| 2015/0023631 | A1* | 1/2015 | Shastri | B32B 37/16 385/14 |

FOREIGN PATENT DOCUMENTS

| | | |
|---|---|---|
| DE | 4204521 | 6/1993 |
| WO | WO 97/32182 | 9/1997 |
| WO | WO 2006/102001 | 9/2006 |

OTHER PUBLICATIONS

Liping et al., "Theoretical investigation of thermal stability of the center wavelength of a coated fiber Bragg grating," *Proceedings of SPIE*, 4989:38-46 (2003).

Nakajima et al., "A Study for Estimating Thermal Strain and Thermal Stress in Optical Fiber Coatings," *Furukawa Review*, 34:8-12 (2008).

Schmid et al., "Optical Fiber Coatings," Retrieved from http://www.dsm.com/content/dam/dsm/supercoatings/en_US/documents/12-2-10-optical-fiber-coatings-chapter-01.pdf, pp. 1-28 (Feb. 12, 2010).

* cited by examiner

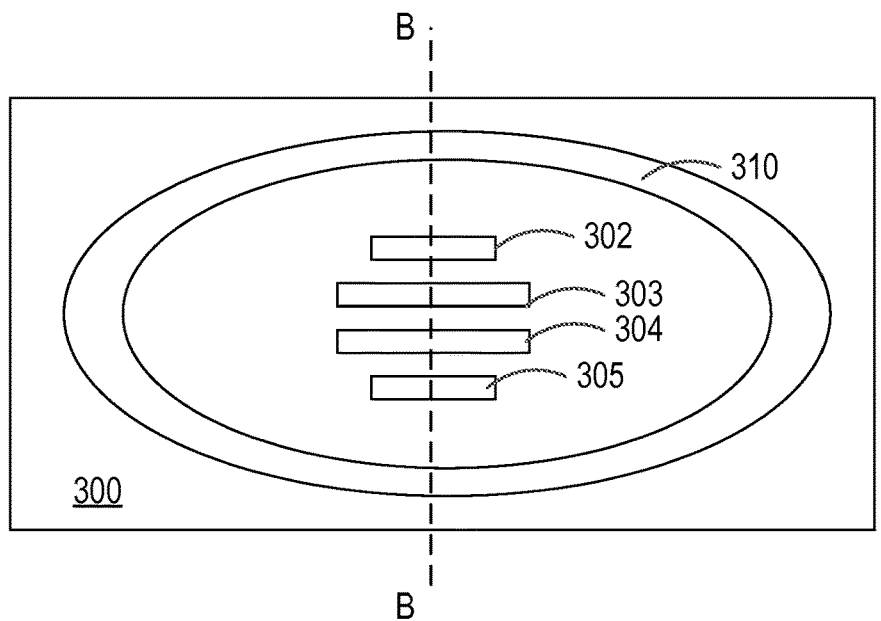
FIG. 3A
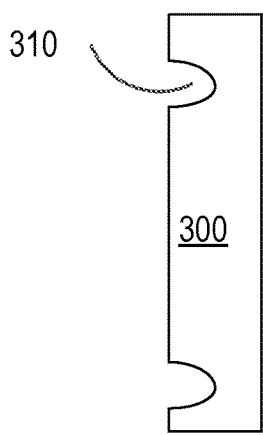
FIG. 3B
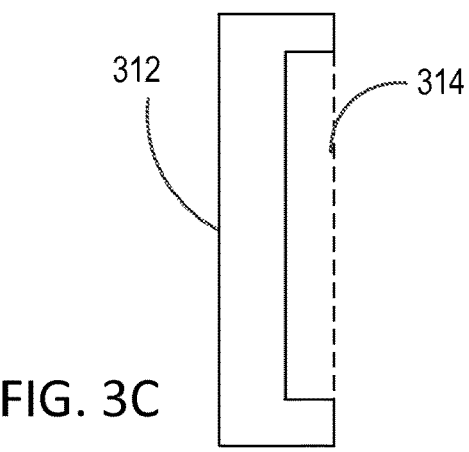
FIG. 3C
FIG. 3D
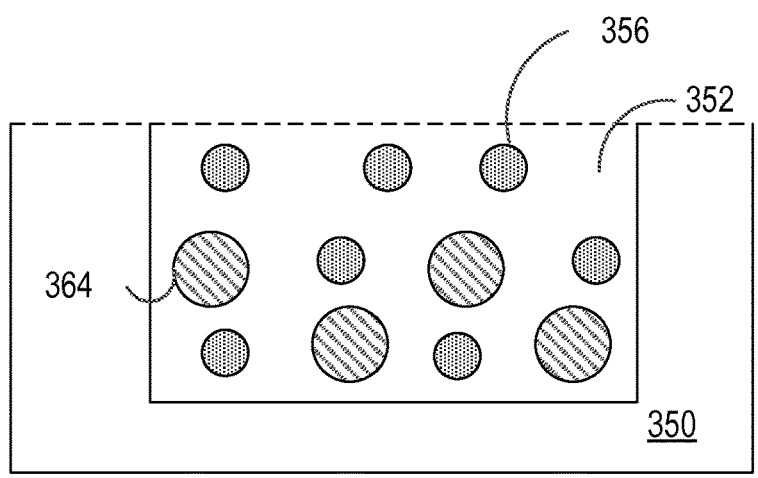

THERMALLY COMPENSATED FIBER INTERFEROMETER ASSEMBLY

CROSS REFERENCE TO RELATED APPLICATIONS

This application is the U.S. National Stage of International Application No. PCT/US2015/033828, filed Jun. 2, 2015, which was published in English under PCT Article 21(2), which in turn claims the benefit of U.S. Provisional Application 62/007,262, filed Jun. 3, 2014, which is incorporated herein by reference.

FIELD

The disclosure pertains to laser radar systems.

BACKGROUND

Coherent laser radars provide distance measurements and surface profiles based on a heterodyne frequency resulting from interference of measurement and local oscillator optical beams. Typically, one or more frequency chirped laser beams are used to form a measurement beam, and the detected heterodyne frequency depends on the chirp rate. A distance is measured based on the detected heterodyne frequency and the chirp rate.

In many cases, optical systems used in laser radars produce numerous internal reflections that are unrelated to targets of interest. These reflections can mask or interfere with target measurements. To avoid the undesirable effects of these internal reflections, some laser radars include an optical delay in a measurement beam path so that these reflections will have disappeared before data acquisition begins. Unfortunately, variations in this optical delay produce unacceptable target distance errors. The disclosure addresses these and other shortcomings of conventional laser radars.

SUMMARY

Fiber assemblies for laser radar comprise a first optical fiber defining a first optical path length, the first optical fiber having a first effective thermal path length coefficient. A second optical fiber having a second effective thermal path length coefficient that defines a second optical path length. The first optical path length is different than the second optical path length, and the first and second optical fibers define a thermally compensated optical path difference. An optical beam divider is situated to couple a first beam portion and a second beam portion of an optical beam to the first optical fiber and the second optical fiber, respectively. An optical beam combiner is situated to receive the first beam portion and the second beam portion from the first optical fiber and the second optical fiber, respectively, and direct the combined beams to an output optical fiber. In some examples, the thermally compensated optical path difference is at least 0.1 m or 0.25 m and a ratio of the effective thermal path length coefficients is greater than about 1.2, 1.5, 2, or more. Typically, at least one of the optical beam combiner and the optical beam divider is a fiber coupler. In some examples, the first optical fiber includes at least a first segment, a second segment, and a third segment, and an optical circulator is situated to receive an optical beam from the first segment and couple the optical beam to the third segment and to couple a portion of the optical beam returned to the third segment to the second segment. In additional examples, the second optical fiber includes at least a first segment, a second segment, and a third segment, and an optical circulator is situated to receive an optical beam from the first segment and couple the optical beam to the third segment and to couple a portion of the optical beam returned to the third segment to the second segment.

Laser radar systems comprise an optical transmitter that produces a chirped optical beam. A fiber assembly divides the chirped optical beam into a measurement beam portion and a local oscillator portion and defines a measurement beam path and a local oscillator path. A path difference between the measurement beam path and the local oscillator path is thermally compensated. A detection system receives a portion of the local oscillator beam from the local oscillator path and a portion of the measurement beam returned from a target from the measurement beam path and estimates a distance to a target based on the portions. In typical examples, the path difference is greater than 0.1 m, 0.2 m, 0.3 m, 0.4 m, 0.5 m, 1 m, or more. In some embodiments, at least one of the measurement beam path and the local oscillator path includes an optical fiber. In other examples, the measurement beam path and the local oscillator path include a measurement beam path optical fiber and a local oscillator path optical fiber, respectively, wherein the measurement beam path optical fiber and the local oscillator path optical fiber have different effective thermal path coefficients. In further examples, an optical system receives the measurement beam, directs the measurement beam to a target, and receives a portion of the measurement beam returned from the target. A beam pointing system is coupled to select a beam direction to the target, wherein the fiber assembly is secured to the beam pointing system. In representative examples, the beam pointing system includes an azimuthal scanner and an elevational scanner, and the fiber assembly is secured to the azimuthal scanner or the elevational scanner. In some examples, the measurement beam path optical fiber and the local oscillator path optical fiber have different effective buffer coating thicknesses. In a particular example, one of the measurement beam path optical fiber and the local oscillator path optical fiber has a first segment of length L1 and a second segment of length L2 having coefficients of thermal expansion K1 and K2, respectively, wherein K2>K1. The other of the measurement beam path optical fiber and the local oscillator path optical has a length L of a fiber having a thermal expansion K1 such that L−(L1+L2) is the path difference. Typically, a ratio of the path difference to the length L2 is about (K2/K1)−1. In some examples, the segments of length L1 and L2 have different buffer coating thicknesses.

Methods comprise dividing an optical beam into a signal portion and a local oscillator portion and introducing a temperature compensated delay between the signal portion and the local oscillator portion. A signal portion received from a target and the local oscillator portion are combined subsequent to introducing the temperature compensated delay so as to produce a heterodyne signal. A target location is identified based on the heterodyne signal. In some examples, the temperature compensated delay corresponds to at least 0.1 m and is introduced by directing the signal portion and the local oscillator portion to optical fibers having different effective thermal path coefficients.

The foregoing and other objects, features, and advantages will become more apparent from the following detailed description, which proceeds with reference to the accompanying figures.

BRIEF DESCRIPTION OF THE DRAWINGS

FIGS. 3A-3C illustrate a housing for fibers that define a thermally compensated path difference.

FIG. 3D illustrates an arrangement of fibers that defines a thermally compensated path difference.

DETAILED DESCRIPTION

Figure 1:
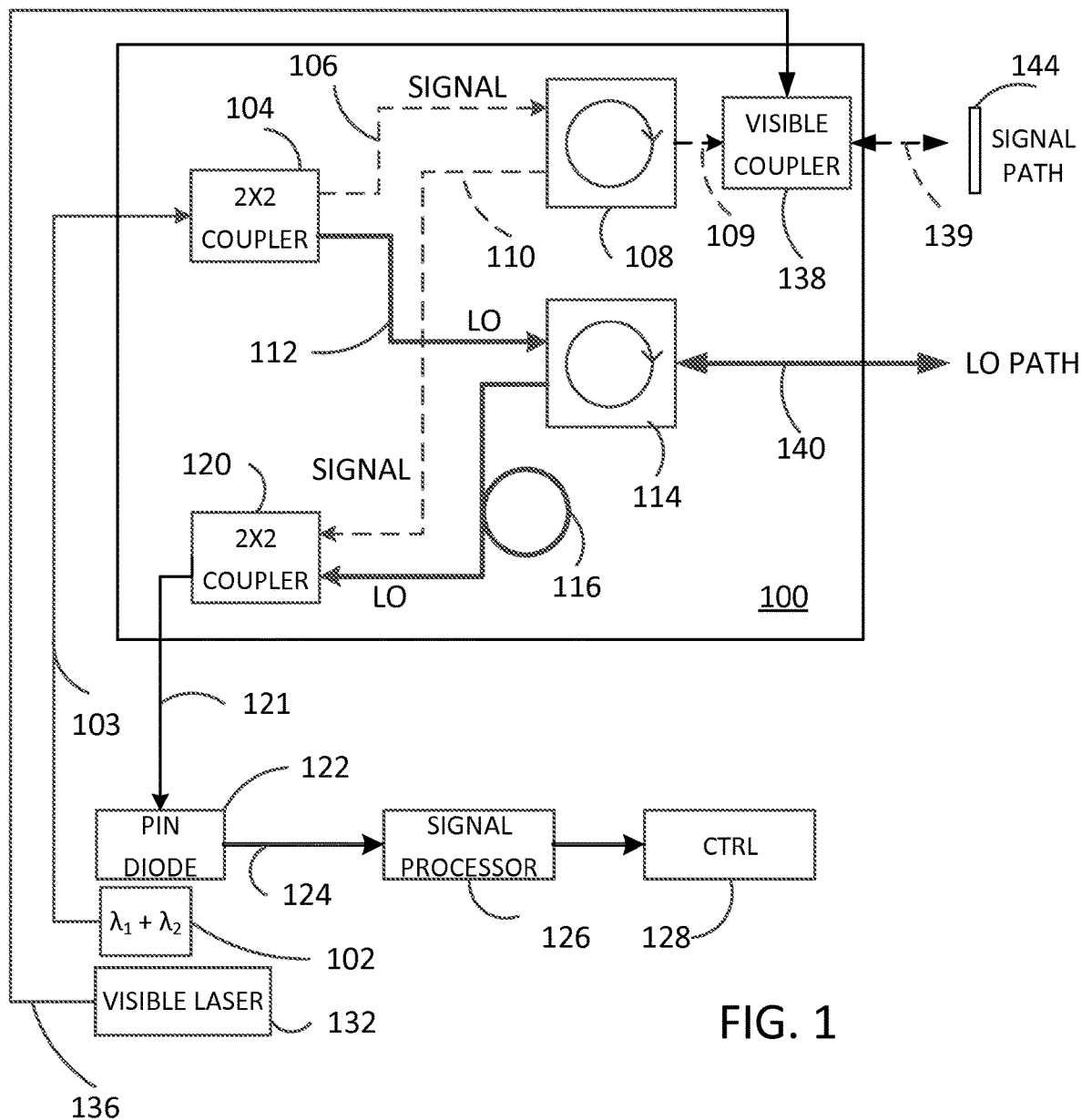
FIG. 1 illustrates a laser radar that includes a thermally compensated fiber array.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

In the disclosed examples, optical beams are generally delivered and received using optical fibers. While conventional single mode fibers can be used, for optical systems based on coherent detection, polarization maintaining fibers are frequently more convenient so that signal beams and local oscillator beams can be maintained in a common state of polarization for interference with each other. Optical beam dividers and combiners such as fiber couplers and circulators are used in some examples, but bulk optical devices such as beam splitters (including polarizing and non-polarizing cube beam splitters) can be used instead. As used herein, an optical beam refers to propagating electromagnetic radiation at wavelengths between about 200 nm and 10 μm. Typical applications are based on optical beams at wavelengths between about 400 nm and 2 μm. Optical beams can propagate free space or in lenses, mirrors, or other optical elements, or in waveguides such as optical fibers. Some examples are described with reference to single mode, polarization maintaining optical fibers, but other fiber types can be used. In some examples, optical beams are propagated bidirectionally in one or more fiber segments. As used herein, a signal beam or measurement beam is an optical beam (or portion) that is to be directed to a target; a local oscillator (LO) beam is an optical beam used as a reference beam to establish a heterodyne frequency at a detector. For clarity in illustration, fiber segments associated only with signal beam portions are generally indicated with dashed lines, and fiber segments associated only with LO beam portions are indicated with dark solid lines. Optical paths associated with signal and LO beam portions are shown with lighter solid lines.

Material coefficients that describe changes in optical path length per degree are referred to herein as thermal path length coefficients. In some cases, thermal path length coefficients are substantially the same as coefficients of thermal expansion. For example, a path length change can be a function of only (at least approximately) actual length changes. However, thermal changes in refractive index can also result in thermally induced path length changes. As used herein, an effect thermal path length coefficient for an optical path provided by several path segments is an appropriately weighted value of coefficients for each of the several segments. For example, for a path defined by two fiber segment of length L1 and L2 having thermal coefficients K1 and K2, respectively, the effective thermal coefficient is based on K1, K2 and the lengths of the respective segments. In one example, the effective value $K_{eff}$ is can be defined as $$K_{eff} = \frac{K_1 L_1 + K_2 L_2}{L_1 + L_2}.$$

In some cases, fiber or other path lengths are traversed more than once, and total introduced delay (and effective fiber length) is based on the number of traversals. Similarly, fibers that include multiple segments can have effective buffer coating thicknesses that are based on weighting of different buffer coating thicknesses based on lengths of associated fiber segments. Various fiber types can be used such as single mode, multimode, gradient index, step index, photonic crystal, and polarization maintaining fibers having core and cladding dimensions as may be convenient, but other types of waveguides can be used. Fibers can have coatings that define thermal properties such as metallic (e.g., copper or aluminum) or non-metallic coatings such as buffer coatings. As used herein, differing fiber types is used generically to refer to fibers differing in one or more characteristics such as core diameter, cladding diameter, mode field diameter, buffer coating diameter, buffer coating material(s), number of layers in a buffer coating, core or cladding materials including dopants, or other optical fiber characteristics. In typical examples, changes in an optical path length difference as a function of temperature are reduced, eliminated or otherwise controlled using differing fiber types and combinations of differing fiber types, particularly fibers having different buffer coating diameters, materials, and/or numbers of layers. In some cases, an outer buffer coating is situated on an inner buffer coating. A buffer coating diameter refers to an outside diameter of a buffer coating.

Fiber arrays for laser radar can include a variety of fiber optic components that are compact enough to mount to the elevation assembly and thus move in azimuth. Such arrays can separate signal and LO paths for transmission to beam forming and scanning systems and then recollect the signal light from the target and the returned LO light and combine them to produce a heterodyne measurement signal. Such arrays can be used with dual chirp laser radars that include two counter-chirped laser sources or in laser radars using a single laser source. Such a fiber array can be arranged to exhibit reduced temperature sensitivity thus minimizing ranging errors associated with fiber array temperature changes, even without active temperature control.

In a representative laser radar, optical beams from two laser sources are combined using an optical coupler so that optical beams at the two associated wavelengths are carried by a single PM fiber to a fiber array that divides the combined beams into a signal beam and a local oscillator (LO) beam that propagate in respective fibers. In some examples, these beams are counter-chirped such that each beam has a frequency chirp that is equal and opposite the other. In other examples, the beams have different chirps that may or may not be equal or opposite. Each of these fibers is attached to one of two PM fiber optic circulators or polarization splitters. The output of the LO circulator travels into bulk optics of an optical beam forming and focusing assembly, through a ¼ wave plate and along a LO path (preferably a so-called "remote" LO or RLO path that is proximate to a signal path. Typically, the RLO beam is retro-reflected back on itself and returns to the LO circulator in an opposite linear polarization. Similarly, the output of the signal circulator travels via the bulk optics of the optical assembly through a ¼ wave plate and is focused on the target with a focusing adjustment system such as a translatable corner cube reflector (CCR). The signal beam portion returned from the target re-enters the signal circulator in an opposite linear polarization and is mixed with the returned LO beam in a second 50/50 PM fiber coupler. The resulting mixed signal exits the fiber array and travels via a PM fiber to a photodetector. The laser sources and the photodetector can be encased in a temperature stabilized chamber or oven, thermally coupled to a heating/cooling device such as a thermoelectric device, or otherwise temperature stabilized. Such a thermal stabilization device need not move with either elevation or azimuthal pointing adjustments, so that device size and power consumption tend not to be critical.

The advantages of this configuration include locating the photodetector at the thermal control device near signal processing electronics thus reducing noise pick-up. The use of circulators insures that ranging noise due to limited polarization extinction is reduced. In order to provide a visible light indicator to the user, a separate red pointing laser source can be injected into the signal beam path via a coupler at the output of the signal circulator.

Using counter-chirped beams, a change in optical path length between the signal path and the LO path produces a heterodyne frequency change which is measured as a change in a range to the target. The signal and LO beams share a common path until they reach the fiber array. However, the beams propagate along different paths in the fiber array. Any path length changes within the fiber array can be mistaken as part of a range measurement. Temperature stabilization of a fiber array is inconvenient as it may be desirable to locate the fiber array so as to move with elevation or azimuthal scanning. In addition, it is generally advantageous to provide a fixed optical path difference between the signal beam and the LO beam so any reflections in the optical assembly are outside the measurement band and to reduce the effects of backscattered light noise. Typically, path differences (in fiber) of between about 0.1 m and 10 m are used, and in one particular example a path difference of about 0.5 m is selected. Using multiple fiber segments in each of the signal path and the LO path, a total path difference $\Delta$ is given by $$\Delta = \sum_{i=1}^{n_{LO}} L_{LOi} - \sum_{i=1}^{n_s} L_{Si},$$

where $n_{LO}$, $n_s$ are the numbers of fiber segments in the LO and signal paths, respectively, and $L_{LOi}$, $L_{Si}$ are the lengths of these segments. In some cases, lengths are effective lengths corresponding to physical lengths times a number of times a beam propagates through the length. Delays associated the fiber lengths for most fibers are about Ln. wherein n is a refractive index (typically about 1.5), but actual fiber lengths and length differences are more convenient to specify.

Temperature variation in the path difference $\Delta$ can be reduced by selecting values such that the derivative with respect to temperature is about 0, so that $$0 = \sum_{i=1}^{n_{LO}} K_i L_{LOi} - \sum_{i=1}^{n_s} K_i L_{Si},$$

wherein $K_i$ is a thermal path length coefficient of an $i^{th}$ fiber segment. While multiple different fiber segments can be used in both signal and LO paths, in one example, two different fiber types are used. In some cases, the thermal coefficients K are functions of fiber buffer coating. For example, one single mode PM fiber is readily available with UV cured acrylate buffer coating diameters of 250 µm and 400 µm. Double pass optical changes in length for these two types of fiber are about 18 ppm (K1) per degree C. for a 400

μm thick buffer coating and 13.6 ppm (K2) for a 250 μm thick buffer coating. A fiber length x of 400 μm buffer-coated fiber needed in the shorter path is given by x=L/((K1/K2)−1), where L is a length difference needed. For a length difference L=0.5 m and using the above values for K1 and K2, x=1.54 m. Thus the longer path contains 2.04 meters of fiber (K2 fiber). Such a fiber array should introduce little or no range error in response to uniform temperature changes of the fiber array even without temperature stabilization or other temperature control of the fiber array Fiber lengths and types can be selected to provide a preferred optical path or length difference. In the example above, fiber lengths were selected to provide minimal path length change as a function of temperature change. In other examples, some path length change is permitted or desired, and two or more fiber types can be arranged to provide a difference in length between signal and LO optical paths as desired, with a temperature variation of about zero up to a value that is approximately the same as a value associated with largest available K value. Fiber lengths in fiber arrays can be also be selected to compensate for temperature variations in other components of a laser radar or other device. As used herein, first and second fibers (that can comprise multiple fiber segments) that are selected to provide a path difference L are referred as compensated if a temperature variation in length or optical path per unit change in temperature is less than 0.2, 0.1, 0.05, 0.01, 0.005, 0.001, 0.0005, or 0.0001 times LK, wherein K is a temperature coefficient associated with either the first fiber or the second fiber. For fibers that comprise multiple segments, compensation can referred to with respect to an effective K value which is based on lengths and K values of the fiber segment. In some examples, a target value of temperature variation is zero, and temperature variations associated with non-fiber portions of an optical path can be included in a compensated path. In most practical examples, path variations are compensated at temperatures between −40 C. and 50 C., but compensation can be arranged at different temperatures.

Referring to FIG. 1, a compensated fiber array 100 is coupled to a laser source 102 via a single mode polarization maintaining (PM) fiber 103. As shown in FIG. 1, the laser source includes two frequency chirped lasers such as frequency chirped laser diodes operating at wavelengths $\lambda_1$ and $\lambda_2$. The laser source 102 can include temperature controllers such as thermoelectric devices, optical power monitor diodes, optical isolators and other components that are omitted for convenient illustration. PM fiber is preferably used, but conventional single mode fibers can be used as well, though polarization control elements may be necessary. A visible laser 132 (for example, a laser diode emitting at wavelength in a red portion of the spectrum) is coupled to the compensated fiber array 100 via an optical fiber 136, typically a single mode fiber. In addition, an optical fiber 121 couples optical radiation from the compensated fiber array 100 to a photodiode 122 which can be a PIN photodiode, an avalanche photodiode, or other photodetector. The photodetector 122 is electrically coupled via a cable or other electrical interconnection 124 to signal processor 126. The signal processor 126 is generally arranged to detect beat or heterodyne frequencies between two or more optical signals received at the photodiode 122 via the fiber 121. The detected heterodyne frequencies from this coherent detection are then communicated to a control system 128 that provides distance estimates based on the heterodyne frequencies.

The compensated fiber array 100 includes a beam divider 104 such as a two by two fiber coupler that is coupled to the optical fiber 103. The beam divider 104 is shown as a 2 by 2 fiber coupler, but other types of fiber couplers such as 1 by 2 or N by M fiber couplers or other types of beam dividers or combiners can be used. The beam divider 104 couples portions of the input optical radiation (such as chirped optical beams from two laser diodes) to a signal output fiber 106 as a signal beam and a local oscillator (LO) fiber 112 as an LO beam. For purposes of illustration, optical fibers associated with signal paths and reference paths are shown as dashed lines or heavy lines, respectively. The optical fiber 106 is then coupled to an optical circulator 108 that directs the signal beam via an optical fiber 109 to a visible coupler 138 that combines a visible beam delivered by the optical fiber 136 with the signal beam. The combined visible/signal beam is then coupled to a signal fiber 139 and directed to a target under investigation. Focusing/beam forming optics and scan mechanisms (not shown) control beam focus and pointing direction. A wave plate 144 is provided for polarization control. A portion of the signal beam is returned from the target to the fiber 139 and the circulator 108 to a fiber 110 that directs the returned signal portion to a beam combiner 120. In FIG. 1, the beam combiner 120 is shown as a 2 by 2 fiber coupler, but other types of fiber couplers such as 1 by 2 or N by M fiber couplers or other types of beam combiners can be used.

The LO fiber 112 is coupled to an optical circulator 114 so that an LO beam is directed along a fiber 140 to an LO path. Focusing/beam forming optics and additional optical elements in the LO path are not shown. An LO optical system returns at least a portion of the LO beam to the fiber 140. The optical circular 114 is connected to a fiber 116 so as to deliver the returned LO beam to the coupler 120. The combined LO and signal beams are directed to the photo-detector 122 so that a heterodyne or other interference signal is generated. In some configurations, the signal path and LO path co-propagate through focusing/beam forming optics to the extent practical so as to reduce any path differences that would otherwise be associated errors in range measurements.

Typically, lengths of signal path fibers 106, 109, 110, 139 and LO path fibers 112, 140, 116 are selected to provide a predetermined path difference while also providing compensation for temperature variations. In the example of FIG. 1, the LO fiber 116 is shown as introducing a path difference, but such a path difference can be established with one or more of the fibers in one or both of the signal and LO paths. As noted above, temperature compensation is typically provided so that path difference is unchanged (at least to first order) as temperature of the fiber array 100 varies. The path difference and fiber lengths required for compensation can also be based on fiber portions of one or more couplers, circulators, or optical elements in signal or LO paths.

Figure 2:
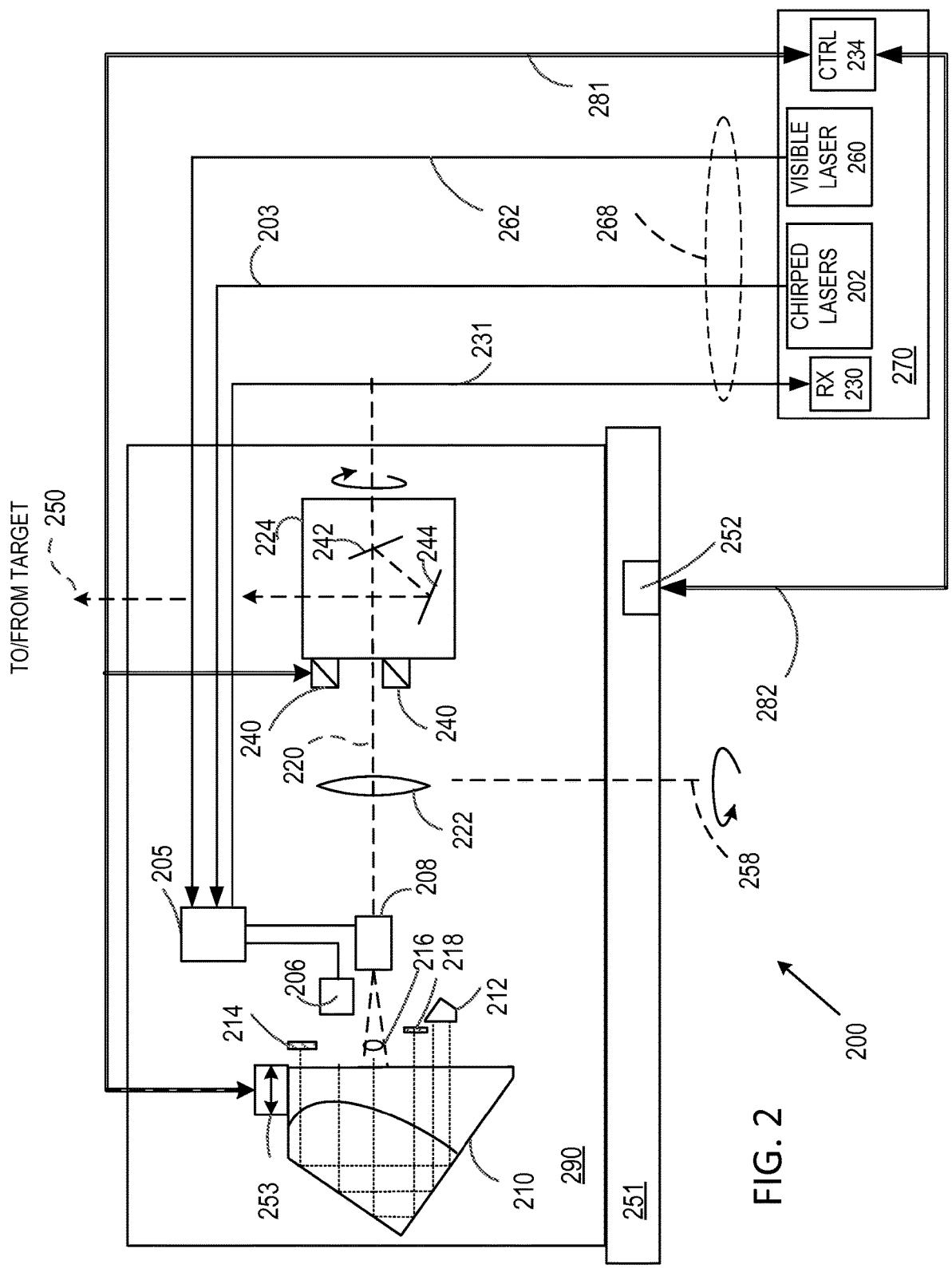
FIG. 2 illustrates a laser radar that includes a thermally compensated fiber array.

With reference to FIG. 2, a laser radar system 200 includes at least one chirped laser 202 that is coupled via an optical fiber 203 to a fiber array 205. The fiber array 205 delivers portions of a chirped laser beam to a local oscillator beam optical system 206 and a measurement beam optical system 208 that produce an LO beam and a measurement beam, respectively. As shown in FIG. 2, the LO beam optical system 206 is configured to couple the LO beam through a focus adjustment corner cube 210 for reflection by an LO corner cube 212 and an LO return reflector 214, preferably implemented as a retro-reflector. In other examples, a roof prism is used instead of the corner cube 212 which typically permits a compact assembly. The measurement beam pickup/delivery optical system 208 directs a diverging measurement beam 216 to the focus adjustment corner cube 210 and to a return reflector 218. In this configuration, the LO is a "remote LO" in that path differences associated with the focus adjustment corner cube 210 are substantially the same for the measurement optical path and the LO optical path, i.e., four passes through the focus adjustment corner cube 210 for the LO beam and the measurement/return beams.

The laser radar system 200 is configured so that the measurement beam is directed along an axis 220 to an objective lens 222 and to an elevational scan assembly 224. A return beam is collected by the objective lens 222 and coupled to the fiber array 205 along a reverse of the measurement beam optical path. A photodiode 230 is coupled to receive the combined LO and measurement beams via an optical fiber 231 and produce a signal at a heterodyne frequency that is coupled to an amplifier or other processing system that can be included in system controller 234 configured to provide range estimates based on heterodyne frequencies.

The system controller 234 can include or be based on a personal computer or other computing device (not shown in FIG. 2) such as a laptop, tablet, a workstation, or a handheld communication device. The detected interference (heterodyne) signal from the photodiode 230 can be processed to calculate or compute a range estimate based on detected heterodyne frequencies. In some examples, the system controller 234 can include one or more computers that can be in a common location or coupled via a wired or wireless network such as a local area network or a wide area network. A first computer can receive signals from the photodiode 230 and forward the received signals or digital or other representations thereof to a second computer using a wired or wireless communication network or communication link. The second computer establishes range estimates using received signals based on heterodyne frequencies.

The elevational scan assembly 224 includes bearings 240 configured for rotation about the axis 220. The bearings 240 typically include encoders as well that permit determination of rotational angle. First and second reflectors 242, 244 are situated to direct the measurement beam along a rotatable axis 250, but in other examples, a single reflector or three, four, or more reflectors are used.

The elevational scan assembly 224 and the LO and measurement beam optical systems can be secured to a base 251 that is coupled to an second scan mechanism 252 that is configured to rotate the base 250 about an axis 258 so as to provide azimuthal beam scanning. Scanning of the measurement beam is directed by the control system 234 that is coupled to the elevational scan assembly 224 and the secondary scanner 252. The control system 234 is also coupled to a translation stage 253 that is situated to translate the focus adjustment corner cube 210 in a direction parallel to the axis 220 so as to focus the measurement beam at a target surface.

A laser diode 260 or other source of a visible beam is coupled to the fiber array 205 via a fiber 262 and provides an alignment beam that co-propagates with the measurement beam to a target. The visible laser 260, the chirped lasers 202, the photodiode 230, and the control systems 234 can be included in a control/detection assembly 270 that is coupled to the fiber array 205 with optical fibers 203, 231, 262 that can be included in a cable 268. In addition, one or more electrical connections such as cables 281, 282 are connected to scan mechanisms, encoders, focus adjustment mechanisms, and other electromechanical components. As shown in FIG. 2, beam delivery and detection optics (focus mechanisms, fiber arrays) and elevational scan components are included in a scannable elevational assembly 290 that is secured to the rotatable base 251.

Referring to FIGS. 3A-3C, a fiber module can be enclosed in a container having a base 300 and a lid 312, preferably formed of a material with a relatively high thermal conductivity such as metal (for example, copper or aluminum). The base 300 includes an oval recess 310 (also referred to as a "racetrack") to permit coiling of fibers and fiber segments. FIG. 3A also indicates locations 302-305 that are interior to the racetrack 310 and are suitable for locating fiber couplers and circulators used for signal, LO, and visible beams, as desired. FIG. 3B further illustrates the groove 310 in the base 300. FIG. 3C is a sectional view of the lid 312, showing a recess 314 suitable for enclosing couplers, rotators, and other components. The racetrack 310 can be filled after fibers are in place, typically with a thermally conductive epoxy, but other fillers can be used. Alternatively, fibers can remain loose in the recess 310. In some examples, the base 300 is used to define a suitable recess or mounting area for couplers and other components. Components need not be mounted internally to the racetrack 310 but can be situated within and/or external to the racetrack 310. The racetrack 310 can be of various shapes such as circular, oval, elliptical, polygonal, or formed of a series of curved or straight segments such as a serpentine shape. Fibers can be wrapped around a cylindrical or other support, and need not be situated in a cavity.

FIG. 3D illustrates a representative arrangement of fibers in a racetrack cavity 352 defined in a substrate 350. Fibers 356, 364 are alternately arranged, or otherwise interspersed with each other. For example, loops of fibers 356, 364 can be alternately situated in the cavity 352, or alternate layers of loops of the fibers 356, 364 can be used. Typically, fibers are situated so that each fiber is subject to common temperature distribution. To the extent that fibers are subject to common temperature variations, such temperature variations do not tend to introduce a path difference between the fibers. For example, as noted above, for fibers at a common temperature, fibers and fiber segments are selected so that $$0 = \sum_{i=1}^{n_{LO}} K_i L_{LOi} - \sum_{i=1}^{n_S} K_i L_{Si}$$

to maintain a path difference that is substantially independent of temperature. If fiber temperature is locally varying, such that a temperature difference $\Delta T$ with respect to a common reference temperature, is a function of position in the racetrack cavity 352, i.e., $\Delta T = \Delta T(r)$, then fiber path difference remains substantially independent of temperature if:

$$0 = \sum_{i=1}^{n_{LO}} K_i L_{LOi} \Delta T_i(r) - \sum_{i=1}^{n_S} K_i L_{Si} \Delta T_i(r).$$

In some examples, fibers are uniformly distributed in a housing recess. In typical examples, fibers are situated in a recess in a housing or are enclosed in a housing. Housings are preferably formed of a thermally conductive material have a thermal conductivity of at least 5 W/mK, but larger values are preferred. Metals such as aluminum or copper (or other metals) can be used. A thermally conducive housing tends to reduce temperature gradients experienced by the fibers.

Figure 4:
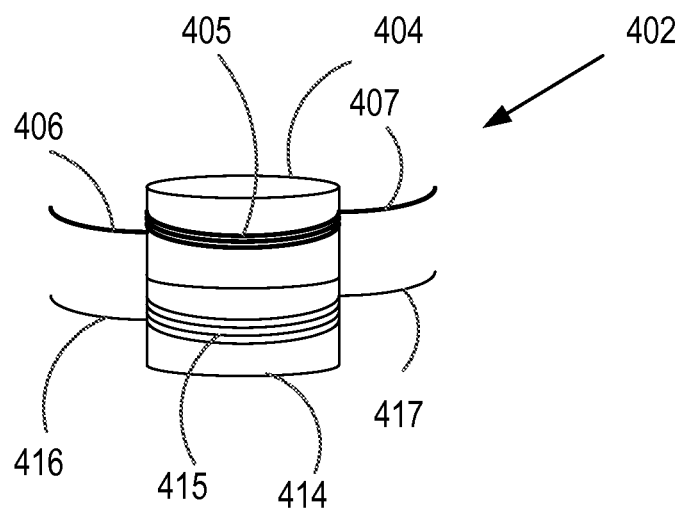
FIG. 4 illustrates fiber coils situated on cylinders having different coefficients of thermal expansion arranged to provide a thermally compensated path difference.

With reference to FIG. 4, a first cylinder 404 of a first material is wrapped with a fiber coil 405. Fiber ends 406, 407 can be coupled to receive signal, local oscillator, or other beams. A second cylinder 414 of a second material is wrapped with a fiber coil 415. Fiber ends 416, 417 can be coupled to receive signal, local oscillator, or other beams. The first and second materials have different thermal expansion coefficients so that a path difference defined by the fiber coils 405, 415 is thermally compensated. Typically thermally conductive materials are used and are situated in thermal contact with each other. Thermal expansion coefficients (CTEs) are selected so that $0 = CTE_1 L_1 - CTE_2 L_2$ wherein $CTE_1$, $L_1$ and $CTE_2 L_2$ refer to CTEs and lengths of fiber coils 405, 415, respectively, and a path difference $\Delta = L_1 - L_2$. In some examples, multiple fibers with multiple segments of the same or different fibers are used, and two, three, four, or more cylinders or other mechanical surfaces can be used and associated with different CTEs.

Figure 5:
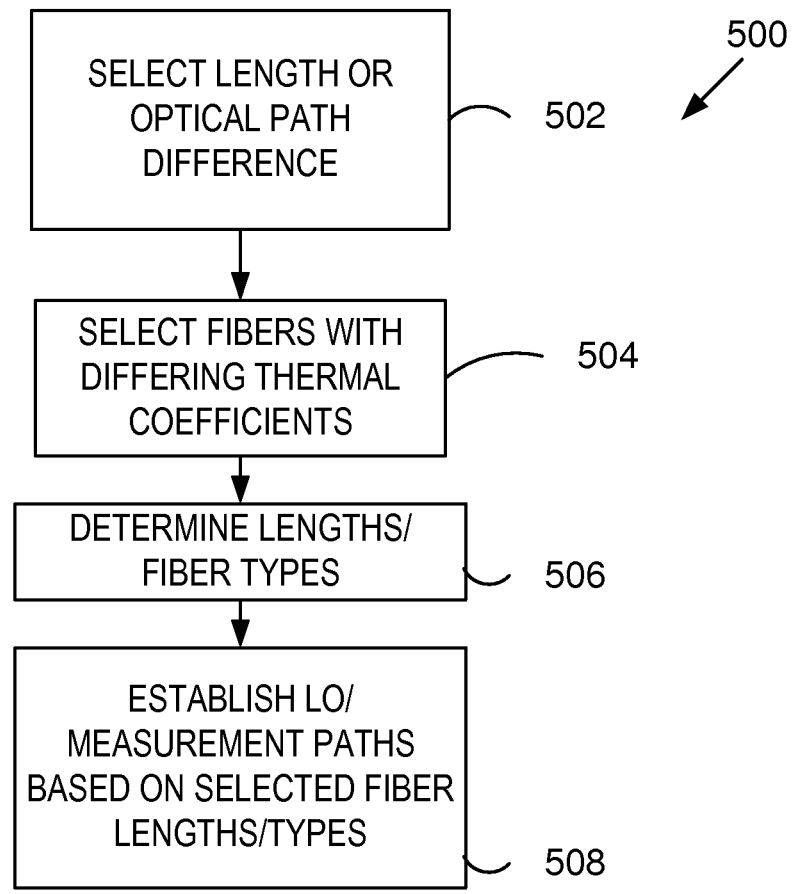
FIG. 5 illustrates a method of defining path lengths so as to provide a thermally compensated path difference.

Referring to FIG. 5, a representative method 500 of establishing a compensated optical path difference between two or more fibers includes selecting a length or path difference $\Delta$ at 502. At 504, optical fibers having at least two different thermal coefficients are selected. At 506, fiber lengths and types are selected so that $$0 = \sum_{i=1}^{n_{LO}} K_i L_{LOi} - \sum_{i=1}^{n_S} K_i L_{Si}$$

subject to the constraint that $$\Delta = \left| \sum_{i=1}^{n_{LO}} L_{LOi} - \sum_{i=1}^{n_S} L_{Si} \right|.$$

In many practical examples, a path difference is established by a first fiber of a single fiber type, and a second fiber having segments of two different fiber types. At 508, specified fiber segments are assembled. Although a path difference can be defined by fibers with multiple segments that are directly coupled to each other, in many cases, fiber segments are separated by bulk or fiber optical elements such as beam splitters, couplers, circulators, and other elements. As noted above, fiber segments can also be selected to compensate path difference changes that are not introduced by fibers, such as path difference changes associated with optical paths in bulk optical element (lenses, prisms, minors and mechanical assemblies retaining and positioning such elements) or paths in fiber optic components such as couplers and circulators.

Figure 6:
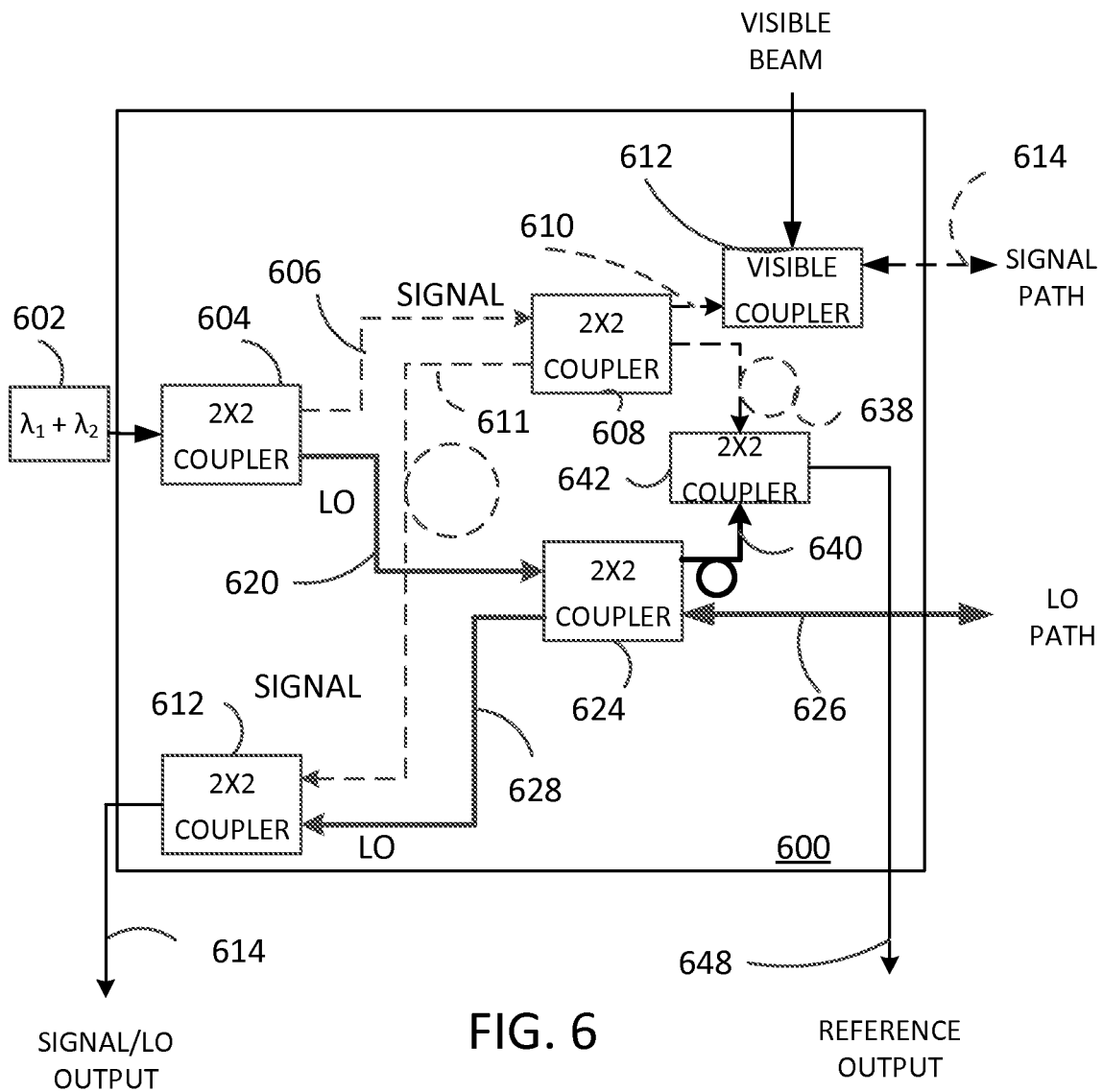
FIG. 6 illustrates a thermally compensated fiber array based on fiber couplers.

Referring to FIG. 6, a fiber module 600 for a laser radar system is coupled to receive a dual wavelength optical beam from a beam source 602 at an optical coupler 604. A signal beam is directed from the coupler 604 to a fiber segment 606 to a coupler 608. A fiber segment 610 couples the signal beam from the coupler 608 to a visible beam coupler 612 that combines the signal beam with a visible beam that are both directed along a signal path to a target under investigation. In some examples, a fiber segment 614 is included in the signal path. A portion of the signal beam returned from the target is coupled to the fiber segment 614, the coupler 612, the fiber segment 610, the coupler 608 and then to a fiber segment 611. An output coupler 612 receives the signal beam portion from the fiber segment 611 and couples the signal beam portion to an output fiber 614.

The coupler 604 directs an LO beam portion to a coupler 624 via a fiber segment 620 and then along a fiber segment 626 to an LO path. As shown in FIG. 6, an LO beam portion is returned to the fiber segment 626, the coupler 624 and then to a fiber segment 628. The LO beam portion is combined with a signal beam portion at the coupler 612 and directed along the output fiber 614.

As shown in FIG. 6, a signal path/LO path difference is defined by signal fiber segments 606, 610 (2 passes), 614 (2 passes), 611 and LO fiber segments 620, 626 (2 passes), 628. Of course, path differences associated with couplers and other portions of beam paths can be considered in establishing a fiber path difference and compensation of path differences. FIG. 6 also shows a signal fiber segment 638 and an LO fiber segment 640 that couple beam portions to a coupler 642 that directs a combined beam along a reference output fiber 648. The fiber segments 638, 640 can be selected to provide a temperature compensated reference length for various uses, such as calibration of laser chirp rates.

Figure 7:
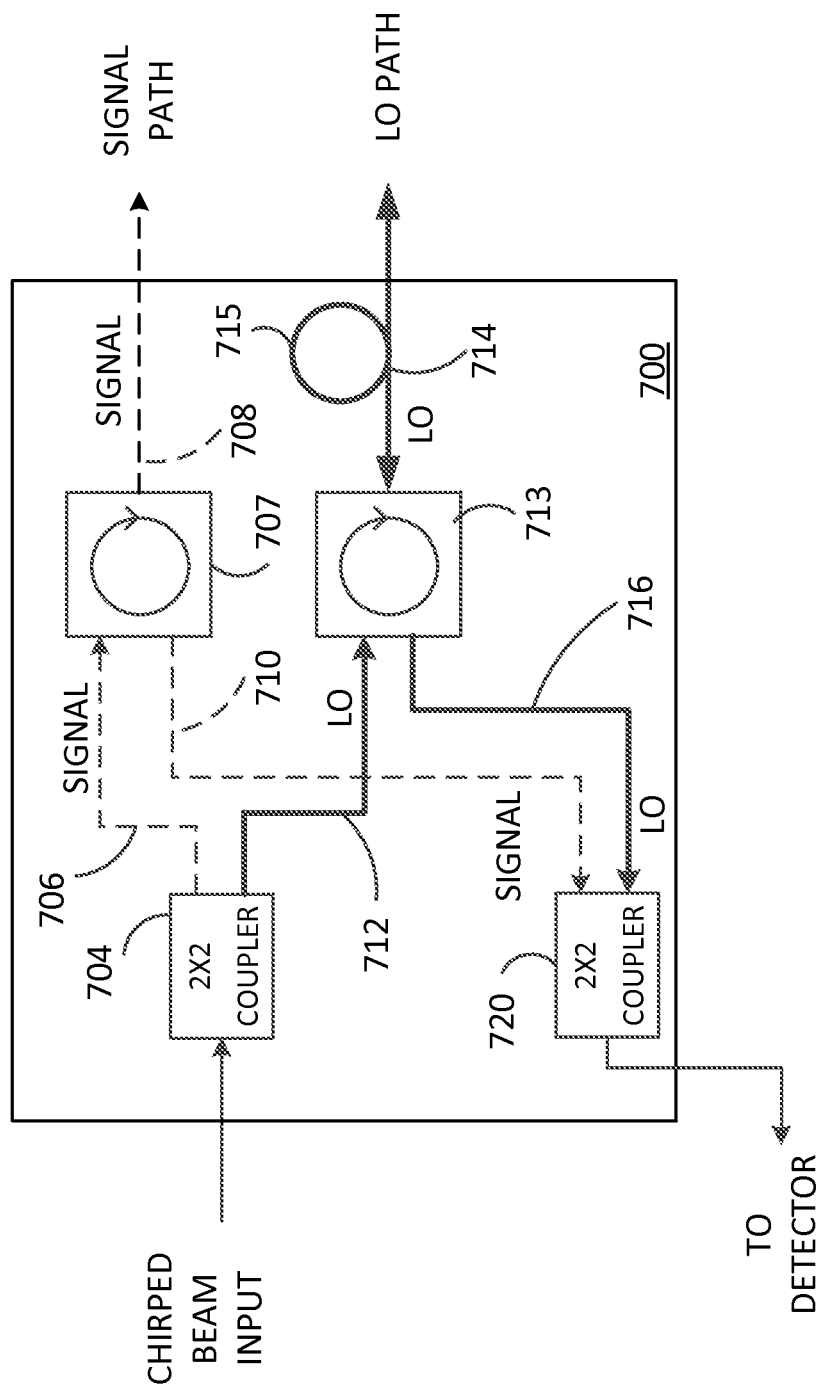
FIG. 7 illustrates a thermally compensated fiber array having a compensating fiber segment in a local oscillator optical path.

With reference to FIG. 7, a fiber module 700 includes couplers 704, 720 and circulators 707, 713 that direct signal and LO beam portion along fiber segments 706, 708, 710 and 712, 714, 716, respectively. The LO path includes a compensating fiber length 715.

Figure 8:
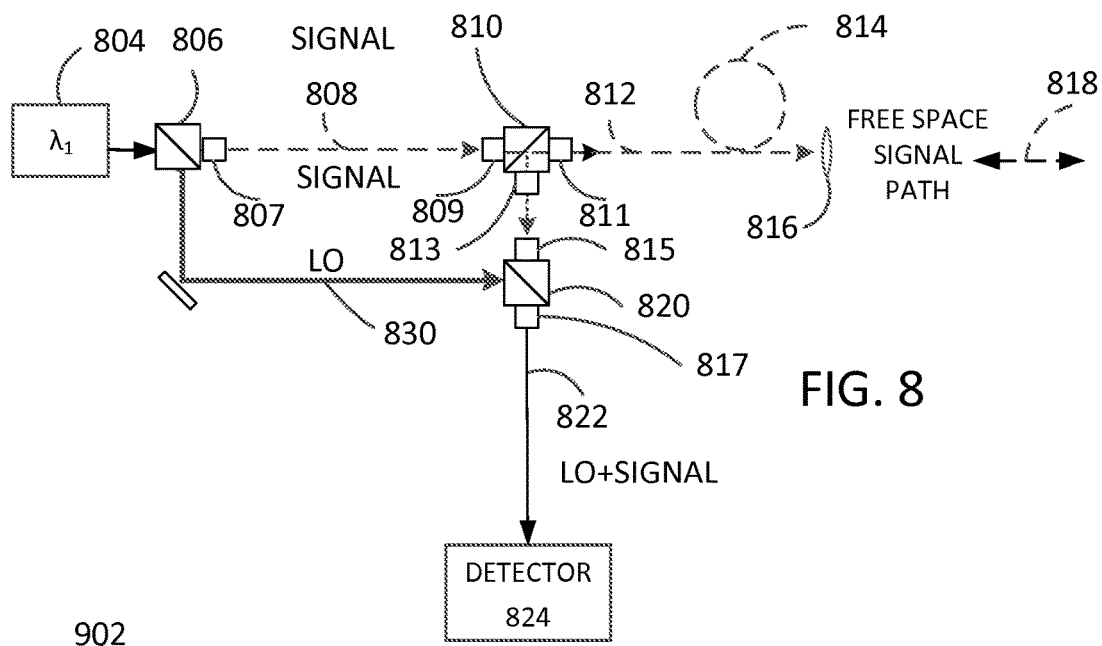
FIG. 8 illustrates a portion of a laser radar system with a thermally compensated signal/LO path difference.

In another example shown in FIG. 8, a laser source 804 directs a beam to a cube beam splitter 806 so that a signal beam portion is directed by a lens 807 into a fiber 808. A lens 809 collimates the signal beam and directs the signal beam to a fiber 812 using a lens 811 and into a beam splitter cube 810. The fiber 812 includes a compensation segment 814 and receives the signal beam and directs the signal beam to a lens 816 along a free space optical path 818 to a target of interest. A returned signal beam portion from the target is directed by the beam splitter cube 800 to a beam splitter cube 820 so that the returned signal beam portion is coupled into an output fiber 822 and a detector 824. Lenses 813, 815, 817 shape the beam portion as needed for coupling into various fiber segments. The beam splitter cube 806 directs an LO beam portion to the beam splitter cube 820 along a path 830. The beam splitter cube 820 couples at least a portion of the LO beam to the output fiber 822 and the detector 824. As shown in FIG. 8, some or all portions of signal or LO beam paths can be in optical fibers or other waveguides, or propagate in free space.

Figure 9:
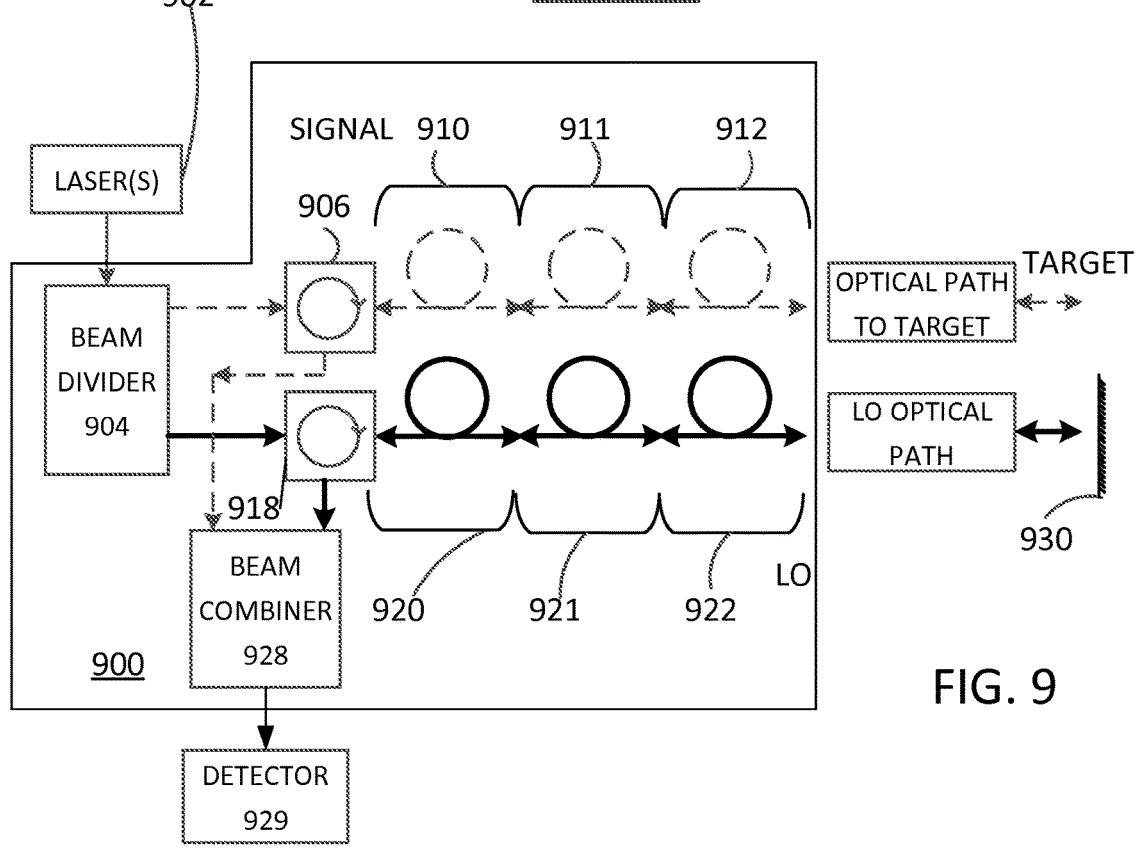
FIG. 9 illustrates a fiber module that includes segmented signal and LO fibers.

FIG. 9 illustrates a fiber array 900 that includes one or more lasers 902 that couple a combined beam to a beam divider 904 that in turn directs the signal beam to an optical circulator 906. A signal beam is directed to fiber segments 910, 911, 912 and then along a free space or other optical path to a target. An LO beam portion is directed to an optical circulator 918 and to fiber segments 920, 921, 922. A reflector 930 returns to LO beam back to the fiber segments 920, 921, 922. A beam combiner 928 combines LO/signal beam and directs the combination to a detector 929. Three segments are shown in FIG. 9 for both signal and LO beams, but more or fewer can be used, and segments can have lengths so as to provide a preferred path difference and to be thermally compensated. The fiber array 900 is suitable for attachment to laser radar scanning systems.

Various buffer coatings and buffer coating thicknesses can be used. Representative coatings include coblock polymers, triblock polymers, polyacrylates, high-temperature acrylates, fluoroacrylates, silicones, silicone/acrylate combinations, polyimides, carbon, fluoropolymers (for example, PFA, FEP, ETFE, PVDF), polytetrafluoroethylene, ethylenetetrafluoroethylene, polyether ether ketone (PEEK), polybutylene terephthalate (PBT), polypropylene, polyethylene, polyamides, polyvinyl chloride (PVC), polyvinylidene fluoride (PVDF), nylon, aluminum, gold, and so-called low smoke, zero halogen (LSZH) filled polyethylene. Fibers can have buffer coatings of one or more of these coatings.

In some examples, buffer coatings comprise polymerized acrylates. Acrylates can include salts, esters, and conjugate bases of acrylic acid and derivatives thereof. In some embodiments, acrylates can comprise at least one carbon-carbon double bond and at least one ester group (i.e., —C(O)O—). Combinations of such acrylates can be applied to optical fibers and polymerized so as to form a buffer coating. Polymerization can be accomplished using various methods. Light-initiated polymerization, such as ultraviolet polymerization using exposure to optical radiation at wavelengths of between about 300 nm and 450 nm and an optional photoinitiator, sensitizer, or both, is one convenient example. For example, a polyester/polyether polyol aliphatic urethane acrylate with a photoinitiator, sensitizer, or both can be cured by exposure to ultraviolet light to form a buffer coating. Such buffer coatings are well known to persons of skill in the art.

In some examples, one or more fiber cladding layers can be provided. For example, an inner (or primary) buffer layer can be situated about a fiber cladding. An outer (or secondary) buffer layer can be situated about the inner buffer layer. Additional buffer layers can be provided as well, and in some cases, release layers or other layers are situated between buffer layers and/or an adhesion promoter is used between the cladding and the inner buffer layer. In a two buffer layer (i.e., dual layer) design, the inner buffer layer is generally softer than the outer buffer layer, with a modulus of elasticity in the range of 2 to 10 N/mm$^2$ and 25 to 2500 N/mm$^2$, respectively. One representative fiber includes an inner buffer of about 190 μm diameter and an outer buffer of about 250 μm or 400 μm. Some representative buffer coating designs and materials are disclosed in Weimann et al., "UV Curable Acrylate Buffer Coating for Optical Fiber," U.S. Patent Application Publication 2013/0011108, which is incorporated herein by reference.

As discussed above, single mode polarization maintaining (PM) fibers are typically used. Typically, such PM fibers have a central core and stress members that produce mode field diameters ranging from about 2 μm to about 15 μm at wavelengths between about 400 nm and 1600 nm, but other mode field diameters and wavelengths can be used. Some particular examples of convenient fibers are listed in the table below. Buffer coating thicknesses can be as large as 900 μm or more. In some examples, buffer coatings are formed of two or more layers of the same or different materials. Fibers such as those listed in the table below are available from Corning Specialty Fiber. Representative Corning part numbers are PM 1550, PM 14XX, PM 1300, PM 980, PM 850, PM 630, PM 480, PM 400, RC PM 1550, RC PM 14XX, RC PM 1300, RC PM 980, Polyimide PM 1550, Polyimide PM 1300, and Polyimide PM 980. One or more of these fibers can be used, and a particular selection generally depends on wavelength of use. Similar fibers from other suppliers can also be used. Custom fibers can be used as well, but commercially available fibers with UV acrylate buffer coatings are generally convenient. As used herein, references to a fiber buffer diameter generally refer to a nominal buffer coating diameter (for example, 245 μm). In some cases, different fibers having the same nominal buffer diameters can be use to form compensated assemblies using variations in nominal buffer diameters. Differences in thermal coefficients may be small in this case, and fibers with greater differences may be more convenient.

| Nominal Wavelengths (nm) | Nominal Cladding Diameter (μm) | Buffer Coating Diameter (μm) | Buffer Material |
|---|---|---|---|
| 1550, 1400-1490, 1300, 980, 850, 630, 480, 400 | 125 | 245 ± 15, 400 ± 15 | UV/UV acrylate (dual layer) |
| 1550, 1400-1490, 1300, 980, 850, 630, 480, 400 | 125 | 900 ± 100 | polyester-elastomer |
| 1550, 1400-1490, 1300, 980 | 80 | 165 ± 10 | UV/UV acrylate (dual layer) |
| 1550, 1400-1490, 1300, 980 | 125 | 145 ± 1 | polyimide |

Representative fiber types

Figure 13:
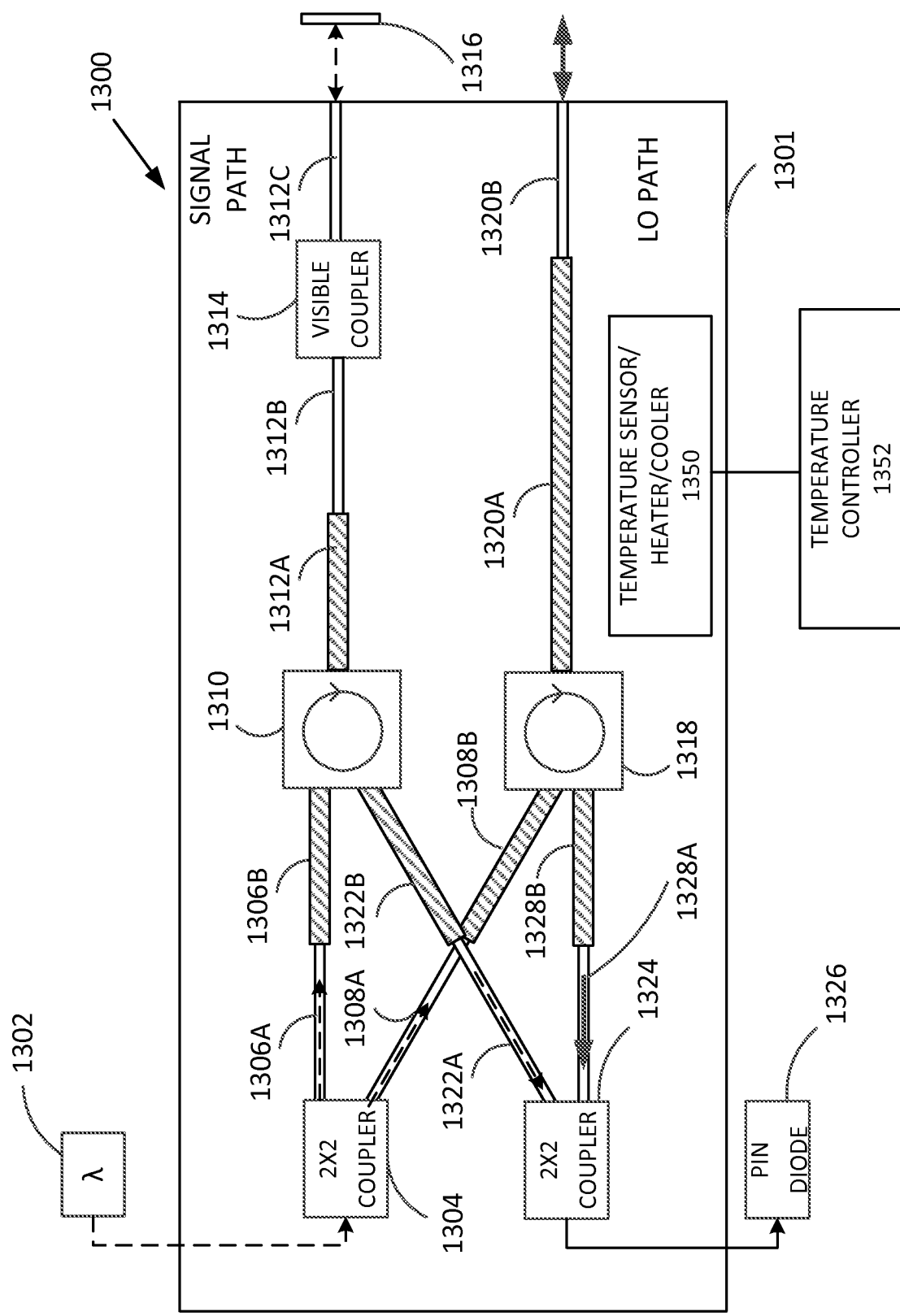
FIG. 13 illustrates a fiber module that includes fibers having different buffer coating thicknesses.

Selecting of suitable fiber lengths and types is described with reference to FIG. 13. As shown in FIG. 13, a fiber module 1300 includes a housing 1301 that contains a temperature sensor 1350 and a heater (and/or cooler) such as a thermoelectric device 1350 that are coupled to a temperature controller 1352 so that fiber module temperature can be either adjusted or effects of temperature changes can be compensated. Such temperature control and monitoring components are used in evaluating fibers and fiber lengths for producing temperature compensated fiber modules, but may not be used in laser radars as temperature compensation may be sufficient. A single wavelength optical beam source 1302 is coupled to a first coupler 1304 that directs a signal beam portion of an optical beam along a signal path to a first circulator 1310 via fibers 1306A, 1306B and then to fibers 1312A, 1312B. A visible coupler 1314 receives the signal beam portion and a visible beam from a visible source (not shown) and directs a combined beam along an output fiber 1312C to a target 1316.

A local oscillator (LO) portion of the optical beam is directed by fibers 1308A, 1308B to a second circulator 1318 and then to fibers 1320A, 1320B so as to propagate along an LO path as an LO beam. The signal beam is returned from the target 1316 via the visible coupler 1314, the fibers 1312A, 1312B, the first circulator and fibers 1322A, 1322B to a second coupler 1324. The LO beam is returned from the LO path via the fibers 1320A, 1320B, the second circulator 1318, and fibers 1328A, 1328B to the second coupler 1324. The combined output (signal and LO beams) is directed to a photodetector 1326 such as a PIN diode. A heterodyne signal corresponding to interference of the signal and LO beams is produced based on a distance to the target 1316.

With the target 1316 at a fixed, constant distance, lengths and fiber types of the fibers 1306A, 1306B, 1308A, 1308B. 1312A. 1312B, 1312C, 1320A, 1320B, 1322A, 1322B, 1328A, 1328B can be selected. In one example, the fibers 1306A, 1308A, 1322A, 1328A can have a common length (for example 1 m) and are of the same fiber type (for example, a single mode PM fiber having a cured UV acrylate buffer coating of diameter of about 245 μm). Similarly, the fibers 1306B, 1308B, 1322B, 1328B can have a common length (for example, 1 m, the same as the fibers 1306A, 1308A, 1322A, 1328A) and are of the same fiber type (for example, a single mode PM fiber having a cured UV acrylate buffer coating of diameter of about 400 μm). This selection of fiber lengths and buffer coatings tends to reduce temperature-induced variations in heterodyne signal frequency. The fibers 1312A, 1312B, 1312C and the fibers 1320A, 1320B can be selected to produce a predetermined path difference and associate heterodyne frequency offset. By appropriate selection, apparent distance variations associated with temperature changes of the fiber module 1300 can be compensated (or enhanced), as desired.

Temperature variations for representative fiber lengths and types are summarized in the following table. Each of the fibers 1306A, 1308A, 1322A, 1328A have a length of 1 m and all are single mode PM fibers having a cured UV acrylate buffer coating of diameter of about 245 µm. Each of the fibers 1306B, 1308B, 1322B, 1328B have a length of 1 m and all are single mode PM fibers having a cured UV acrylate buffer coating of diameter of about 400 µm. The fiber 1312A was a 1 m long single mode PM fiber having a cured UV acrylate buffer coating of diameter of about 400 µm; the fibers 1312B and b 1312C were 1 m long single mode PM fibers having a cured UV acrylate buffer coating of diameter of about 245 µm. Total signal path length (the combined lengths of fibers 1312A, 1312B, 1312C) is 3 m. The LO path length is the combined lengths of the fibers 1320A, 1320B as listed in the table below. The fiber 1320A is a single mode PM fiber having a cured UV acrylate buffer coating of diameter of about 400 µm; the fiber 1320B is a single mode PM fiber having a cured UV acrylate buffer coating of diameter of about 245 µm. The fiber module was subjected to temperature variations of between about 5° C. to 42° C., and the rate of change in estimated target distance per unit temperature change was estimated as a slope of a linear fit to a graph of target distance measured as a function of temperature, with target distance fixed. Nominal cladding diameters can vary within ±5 µm, ±10 µm, ±15 µm, or ±25 µm.

| LO Path Length (m) | LO Path Length in Fiber 1320B (245 µm cladding) (m) | LO Path Length in Fiber 1320A (400 µm cladding) (m) | Error Slope (µm/° C.) |
| --- | --- | --- | --- |
| 2 | 0 | 2 | +8.7 |
| 3 | 0 | 3 | −9.3 |
| 2.5 | 0 | 2.5 | +1.3 |
| 2.5 | 0.5 | 2.0 | +4.9 |

Range error slope as a Function of LO path length and fiber type

As shown in the table, the range error slope sign and magnitude can be adjusted using difference combinations of fiber types and lengths. Range error slopes for different fiber types can be evaluated in order to select a particular combination. Two, three, or more fiber types can be used, and signal and LO path fiber lengths (including total length) can be adjusted. Lengths and types of fibers connected the couplers 1304, 1324 and the circulators 1310, 1318 can be varied as well. The example above used particular fiber types and a single kind of buffer coating in different thicknesses, but different kinds of buffer coatings and thicknesses can be used as well. Temperature compensation generally refers to error slopes of magnitudes that are less than 2.0, 1.5, 1.0, 0.5, or 0.1 µm/° C., or changes in relative path of less than 2.0, 1.5, 1.0, 0.5, or ppm/° C.

One example fiber module uses identical types and lengths of fiber to interconnect couplers and circulators as shown in FIG. 13. (In this example, as in FIG. 13, two fiber types are used, with different buffer diameters.) These fibers are wrapped together to reduce temperature differences. An LO offset is selected, typically between 0 m and 1 m. The amount of fiber offset (i.e., difference in length between the signal and LO fiber paths) is then L/1.47, wherein 1.47 is an approximate index of refraction of the fiber. Given K1 and K2, thermal coefficients associated with the fibers having the two different fiber coatings, the length of fiber x in the shorter path is given by: $x=L/(1.47\ ((K1/K2)-1))$, where K1>K2. For example, if K1=1.5 K2 and L=1.47 m, then the length of the RLO path (from the circulator to a fiber module output) is 2 m of K1 fiber and the length of the signal arm fiber is x+L/11.47 or 3 m of K2 fiber. In this example, the temperature coefficients of 245 µm and 400 µm cladding diameters (UV cured acrylate buffer) are about 12 ppm/° C. and about 18 ppm/° C., respectively.

Figure 14:
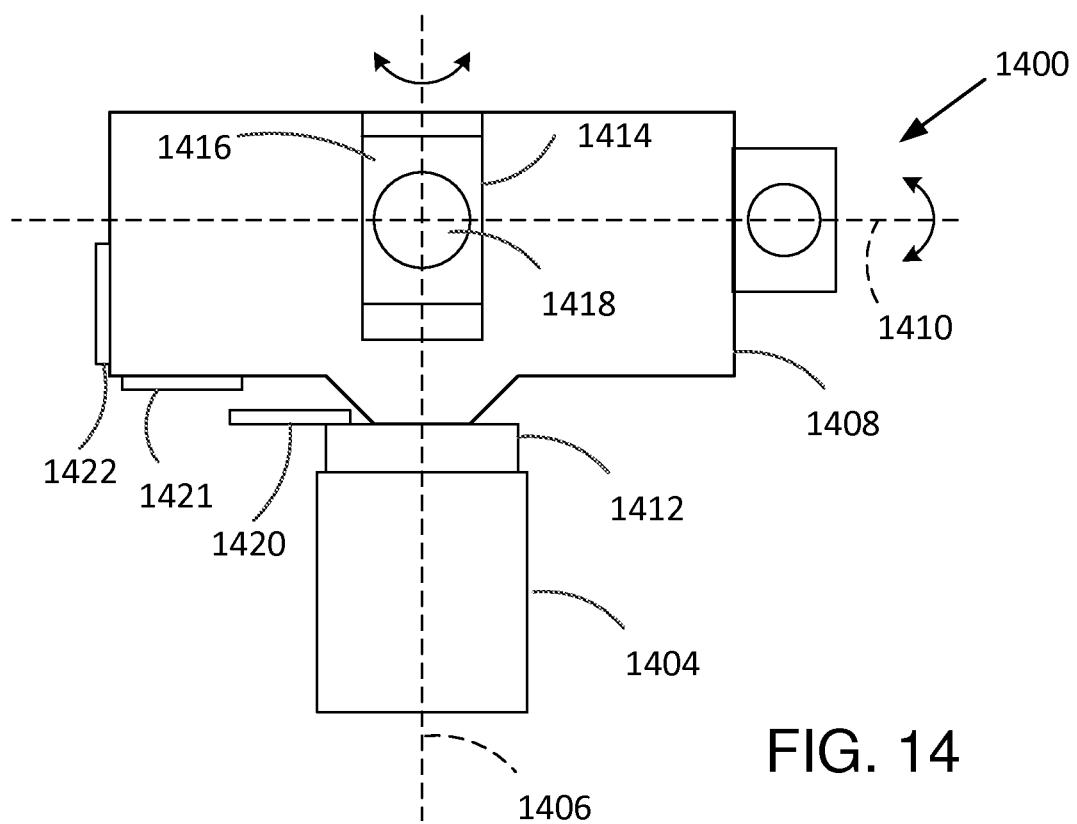
FIG. 14 illustrates fiber module placement on a scanning assembly.

FIG. 14 illustrates a beam scanning assembly 1400 for a laser radar that includes a fiber module that establishes a reference path difference between signal and LO beams. A first scanner base 1404 is connected to a platform 1412 that is rotatable about an axis 1406. A second scanner base 1408 is secured to the platform 1412 and retains an optical system 1418 that is rotatable within the scan mount 1408 about an axis 1410. Signal beam scanning and pointing are thus controllable based on rotations about the axes 1406, 1410 using control and detection electronics that are not shown in FIG. 14. A fiber module 1420 that provides a temperature compensated path difference can be secured to the rotatable platform 1412.

(Alternative locations are shown at 1421, 1422.) The fiber module 1420 receives a dual wavelength beam and establishes signal and LO portions that are delivered along respective signal and LO paths. In addition, the fiber module establishes a temperature compensated path difference (typically defined as a one-way path difference such as 0.25 m, 0.5 m, 1 m, 10 m, 50 m, 100 m, 200 m, or more between signal and LO beams) that establishes a heterodyne frequency between the signal and LO beams. Typically, the fiber module 1420 is not coupled to a temperature controller.

Figure 10:
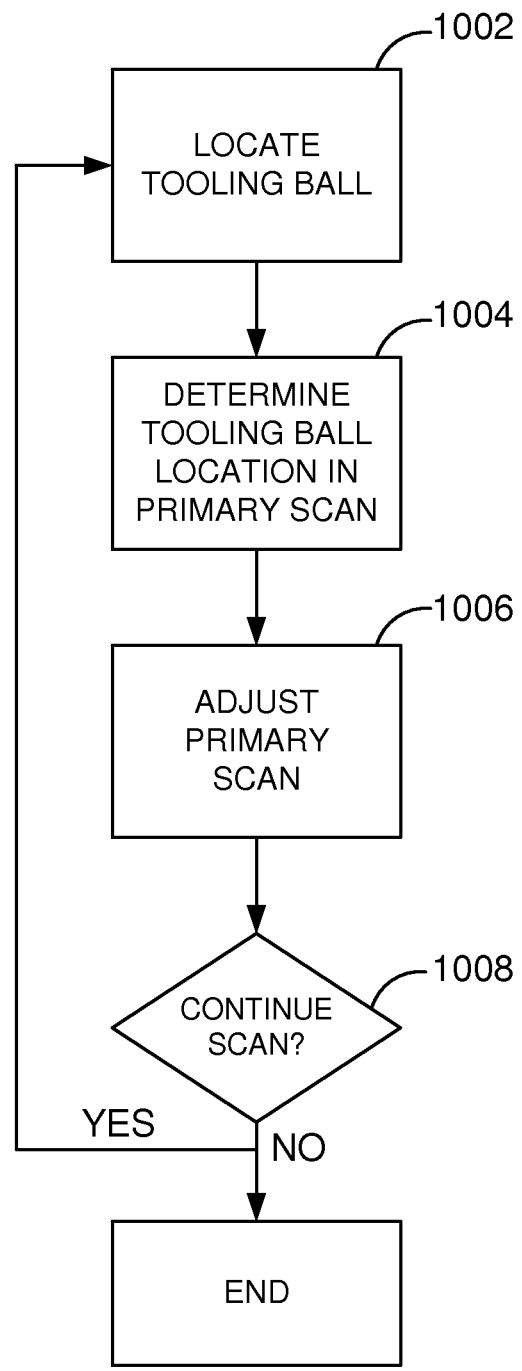
FIG. 10 is a block diagram of a representative method of tracking a tooling ball that is secured to a substrate or target.

FIG. 10 illustrates a representative method of tracking a tooling ball that is secured to a substrate or target using one or more of the fiber arrays and systems described above. One or more tooling balls can be secured to a target to provide reference points for coordinate determinations. Tooling balls generally include a reflective ball-shaped surface in order to provide ample reflection of an interrogation beam in a laser-based measurement apparatus such as a laser radar.

As shown in FIG. 10, at 1002 a tooling ball location is identified and recorded based on returned portions of a scanned interrogation optical beam. The optical beam can be scanned in a variety of patterns such as circles, spirals, w's, or zig-zags so as to track a tooling ball. At 1004, the identified location is evaluated to determine a position with respect to a primary scan. The primary scan is adjusted at 1006 so that the tooling ball location is at a preferred location with respect to the primary scan. Typically, the primary scan is adjusted so that the tooling location is approximately centered within a primary scan range. At 1008, a determination is made regarding additional scanning.

Figure 11:
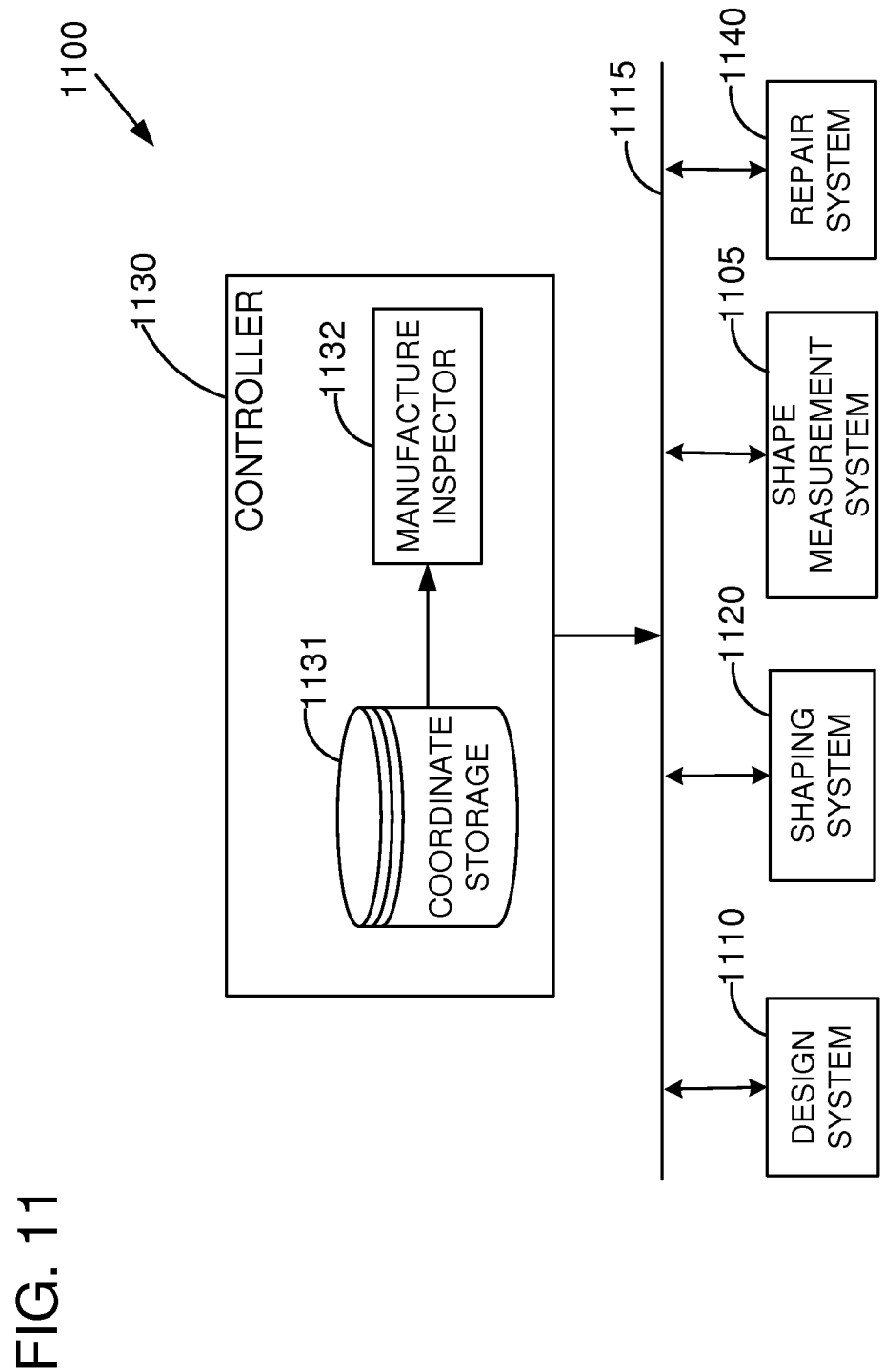
FIG. 11 is a block diagram of a representative manufacturing system that includes a laser radar or other profile measurement system to manufacture components, and assess whether manufactured parts are defective or acceptable.

FIG. 11 illustrates a representative manufacturing system 1100 suitable for producing one or more components of a ship, airplane, or part of other systems or apparatus, and for evaluating and reprocessing such manufactured components. The system 1100 typically includes a shape or profile measurement system 1105 such as the laser radar systems and fiber arrays discussed above. The manufacturing system 1100 also includes a design system 1110, a shaping system 1120, a controller 1130, and a repair system 1140. The controller 1130 includes coordinate storage 1131 configured to store measured and design coordinates or other characteristics of one or more manufactured structures as designed and/or measured. The coordinate storage 1131 is generally a computer readable medium such as hard disk, random access memory, or other memory device. Typically, the design system 1110, the shaping system 1120, the shape measurement system 1105, and a repair system 1140 communicate via a communication bus 1115 using a network protocol.

The design system 1110 is configured to create design information corresponding to shape, coordinates, dimensions, or other features of a structure to be manufactured, and to communicate the created design information to the shaping system 1120. In addition, the design system 1110 can communicate design information to the coordinate storage 1131 of the controller 1130 for storage. Design information typically includes information indicating the coordinates of some or all features of a structure to be produced.

The shaping system 1120 is configured to produce a structure based on the design information provided by the design system 1110. The shaping processes provided by the shaping system 1120 can include casting, forging, cutting, or other process. The shape measurement system 1105 is configured to measure the coordinates of one or more features of the manufactured structure and communicate the information indicating measured coordinates or other information related to structure shape to the controller 1130.

A manufacture inspector 1132 of the controller 1130 is configured to obtain design information from the coordinate storage 1131, and compare information such as coordinates or other shape information received from the profile measuring apparatus 100 with design information read out from the coordinate storage 1131. The manufacture inspector 1132 is generally provided as a processor and a series of computer-executable instructions that are stored in a tangible computer readable medium such as random access memory, a flash drive, a hard disk, or other physical devices. Based on the comparison of design and actual structure data, the manufacture inspector 1132 can determine whether or not the manufacture structure is shaped in accordance with the design information, generally based on one or more design tolerances that can also be stored in the coordinate storage 1131. In other words, the manufacture inspector 1132 can determine whether or not the manufactured structure is defective or nondefective. When the structure is not shaped in accordance with the design information (and is defective), then the manufacture inspector 1132 determines whether or not the structure is repairable. If repairable, then the manufacture inspector 1132 can identify defective portions of the manufactured structure, and provide suitable coordinates or other repair data. The manufacture inspector 1132 is configured to produce one or more repair instructions or repair data and forward repair instructions and repair data to the repair system 1140. Such repair data can include locations requiring repair, the extent of re-shaping required, or other repair data. The repair system 1140 is configured to process defective portions of the manufactured structure based on the repair data.

Figure 12:
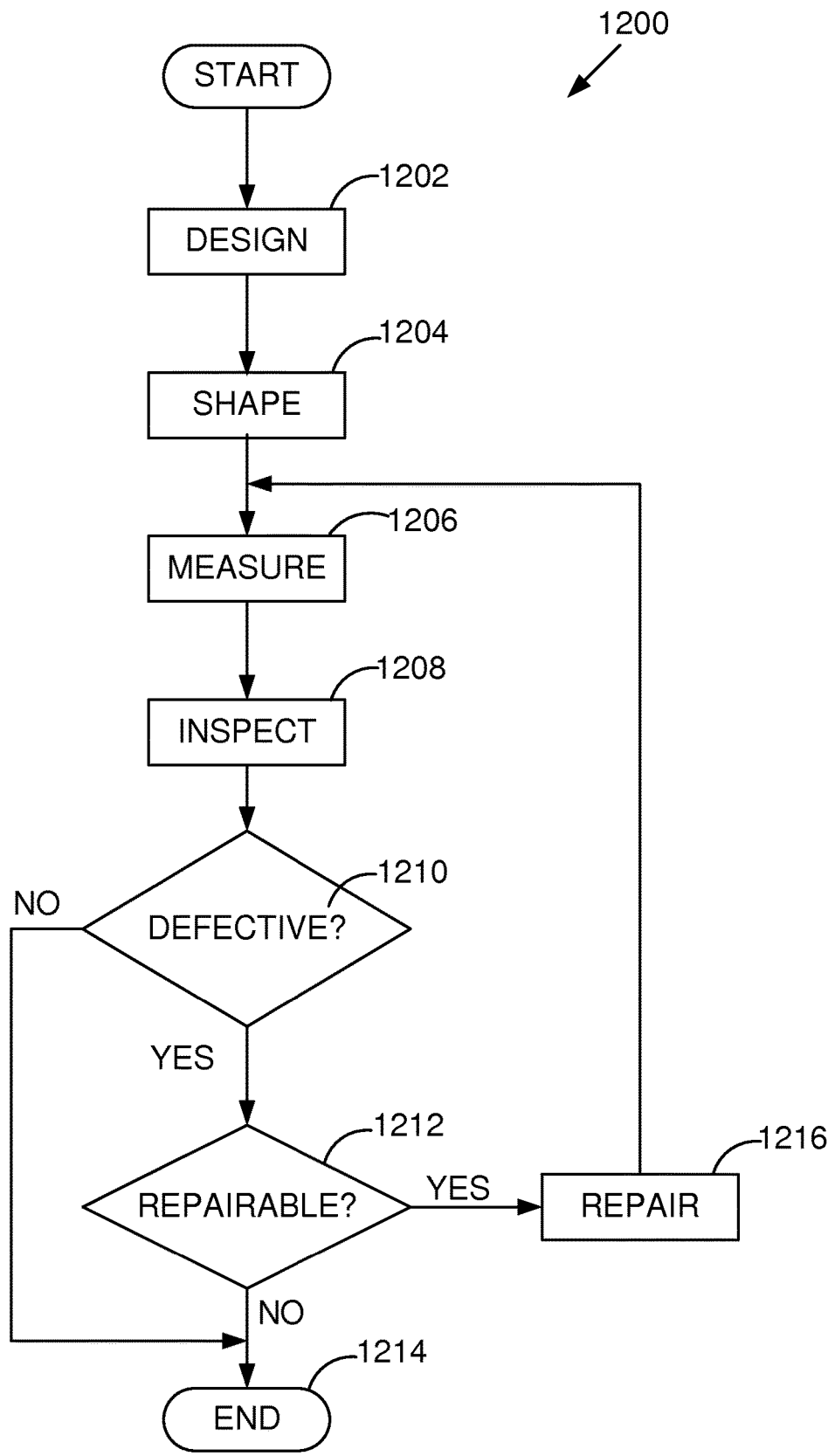
FIG. 12 is a block diagram illustrating a representative manufacturing method that includes profile measurement to determine whether manufactured structures or components are acceptable, and if one or more such manufactured structures can be repaired.

FIG. 12 is a flowchart showing a representative manufacture method 1200 that can incorporate manufacturing systems such as illustrated in FIG. 11. At 1202, design information is obtained or created corresponding to a shape of a structure to be manufactured. At 1204, the structure is manufactured or "shaped" based on the design information. At 1206, coordinates, dimensions, or other features of the manufactured structure are measured with a profile measurement system such as the laser radar systems described above to obtain shape information corresponding to the structure as manufactured. At 1208, the manufactured structure is inspected based on a comparison of actual and design dimensions, coordinates, manufacturing tolerance, or other structure parameters. At 1210, if the manufactured structure is determined to be nondefective, the manufactured part is accepted and processing ends at 1214. If the manufactured part is determined to be defective at 1210 by, for example, the manufacture inspector 1132 of the controller 1130 as shown in FIG. 11, then at 1212 it can be determined whether the manufacture part is repairable. If repairable, the manufactured part is reprocess or repaired at 1216, and then measured, inspected, and reevaluated at 1206, 1208, 1210, respectively. If the manufactured part is determined to be unrepairable at 1212, the process ends at 1214.

According to the method of FIG. 12, using a profile measurement system to accurately measure or assess coordinates or other features of a manufactured structure, a manufactured structure can be evaluated to determine if the structure is defective or nondefective. Further, if a manufactured structure is determined to be defective, a reprocessing process can be initiated if the part is deemed to be repairable based on design and actual structure dimensions and features. By repeating the measurement, inspection, and evaluation processes, defective parts can be reprocessed, and parts that are defective but that are not repairable can be discarded. The particular systems and methods of FIGS. 11-12 are exemplary only, and other arrangements can be used.

In the above embodiment, the structure manufacturing system 1200 can include a profile measuring system such as a laser radar as discussed above, the design system 1110, the shaping system 1120, the controller 1130 that is configured to determine whether or not a part is acceptable (inspection apparatus), and the repair system 1140. However, other systems and methods can be used and examples of FIGS. 11 and 12 are provided for convenient illustration.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim as our invention all that comes within the scope and spirit of the appended claims.

We claim:

1. A fiber assembly, comprising:
   a first optical fiber defining a first optical path length, the first optical fiber having a first effective thermal path coefficient;
   a second optical fiber having a second optical path length, the second optical fiber having a second effective thermal path coefficient, wherein the first optical path length is different than the second optical path length, wherein each of the first and second optical fibers defines a respective optical path length and the combination of the first optical fiber and the second optical fiber defines a thermally compensated optical path difference;
   an optical beam divider situated to couple a first beam portion and a second beam portion of an optical beam to the first optical fiber and the second optical fiber, respectively; and an optical beam combiner situated to receive the first beam portion and the second beam portion from the first optical fiber and the second optical fiber, respectively, and direct the combined beams to an output optical fiber, and wherein the first optical fiber has a first length and a first buffer coating extends along the first length and the second optical fiber has a second length and a second buffer coating that is different from the first buffer coating extends along the second length, and the first and second effective thermal path coefficients are based at least in part on the first and second buffer coatings.

2. The fiber assembly of claim 1, wherein the first optical fiber has a first buffer coating diameter and the second optical fiber has a second buffer coating diameter that is different from the first buffer coating diameter, and the first and second effective thermal path coefficients are based at least in part on the first and second buffer coating diameters.

3. The fiber assembly of claim 2, wherein the first buffer coating diameter is 245 μm and the second buffer coating diameter is 400 μm.

4. The fiber assembly of claim 2, wherein the first buffer coating and the second buffer coating are UV cured acrylates.

5. The fiber assembly of claim 1, wherein the first optical fiber includes first and second fiber segments, the first fiber segment having a first buffer coating diameter and the second fiber segment having a second buffer coating diameter that is different from the first buffer coating diameter, and the first effective thermal path coefficient is based at least in part on the first and second buffer coating diameters.

6. The fiber assembly of claim 5, wherein the first buffer coating diameter is 245 μm and the second buffer coating diameter is 400 μm.

7. The fiber assembly of claim 6, wherein the first buffer coating and the second buffer coating are UV cured acrylates.

8. The fiber assembly of claim 1, wherein the compensated optical path difference is at least 0.1 m.

9. The fiber assembly of claim 1, wherein at least one of the optical beam combiner and the optical beam divider is a fiber coupler.

10. The fiber assembly of claim 1, wherein the first optical fiber includes at least a first segment, a second segment, and a third segment, and further comprising:

an optical circulator situated to receive an optical beam from the first segment and couple the optical beam to the third segment and to couple a portion of the optical beam propagating in the third segment toward the optical circulator to the second segment.

11. The fiber assembly of claim 10, wherein the second optical fiber includes at least a first segment, a second segment, and a third segment, and further comprising:

an optical circulator situated to receive an optical beam from the first segment and couple the optical beam to the third segment and to couple a portion of the optical beam propagating in the third segment toward the optical circulator to the second segment.

12. The fiber assembly of claim 10, wherein one of the first segment, the second segment, and the third segment has an effective buffer coating thickness that is different than an effective buffer coating thickness of the other segments.

13. The fiber assembly of claim 1, further comprising a housing situated about the first optical fiber having the first optical path length and the second optical fiber having the second optical path length.

14. The fiber assembly of claim 13, wherein the housing is situated about the optical beam divider and the optical beam combiner.

15. The fiber assembly of claim 14, wherein the housing encloses the first optical fiber and the second optical fiber.

16. The fiber assembly of claim 13, wherein the housing is thermally conductive.

17. The housing of claim 16, wherein the housing is metallic.

18. The fiber assembly of claim 13, wherein the housing includes a racetrack cavity, and the first optical fiber and the second optical fiber are situated in the racetrack.

19. The fiber assembly of claim 18, wherein the first optical fiber and the second optical fiber are interspersed in the racetrack cavity.

20. The fiber assembly of claim 18, wherein the housing includes a base, wherein the racetrack cavity is defined as a groove in the base.

21. The fiber assembly of claim 18, wherein the housing includes a lid that defines a recess, wherein at least one of the optical beam divider and the optical beam combiner is situated in the recess.

22. The fiber assembly of claim 18, wherein the racetrack cavity is filled with a thermally conductive epoxy.

23. A laser radar system, comprising:

an optical transmitter that produces a chirped optical beam;

the fiber assembly of claim 1, wherein the optical beam divider is coupled to receive the chirped optical beam to produce the first beam portion and the second beam portion, wherein the first optical path length defined by the first optical fiber and the second optical path length defined by the second optical fiber are associated with a measurement beam path and a local oscillator path, respectively; and a detection system that receives the combined beams and estimates a distance to a target based on the first beam portion and the second beam portion of the combined beams, wherein the first beam portion is received from the target.

24. The laser radar system of claim 23, wherein the thermally compensated optical path difference defined by the first optical fiber and the second optical fiber is greater than 0.1 m.

25. The laser radar system of claim 23, further comprising:

an optical system that receives the first beam portion, directs the first beam portion to a target, and receives a portion of the first beam portion returned from the target; and a beam pointing system coupled to select a beam direction to the target, wherein the fiber assembly is secured to the beam pointing system.

26. The laser radar system of claim 23, wherein one of the first optical fiber and the second optical fiber has a first segment of length L1 and a second segment of length L2 having thermal path coefficients K1 and K2, respectively, wherein K2>K1, and the other of the first optical fiber and the second optical fiber has a length L of a fiber having a thermal path coefficient K1 such that L−(L1+L2) is the path difference.

27. The laser radar system of claim 26, wherein a ratio of the path difference to the length L2 is about (K2/K1)−1.

28. The laser radar system of claim 27, wherein in the segments of length L1 and L2 have different buffer coating diameters.

29. A method, comprising:
with the fiber assembly of claim 1:
   dividing an optical beam into a signal portion and a local oscillator portion;
   introducing a temperature compensated delay between the signal portion and the local oscillator portion;
   combining a signal portion received from a target and the local oscillator portion subsequent to introducing the temperature compensated delay so as to produce a heterodyne signal; and
based on the heterodyne signal, identifying a target location.

30. The method of claim 29, wherein the temperature compensated delay corresponds to at least 0.1 m and is introduced by directing the signal portion and the local oscillator portion to optical fibers having different effective thermal path coefficients.

31. The method of claim 29, wherein the temperature compensated delay is introduced by directing the signal portion and the local oscillator portion to optical fibers having different effective buffer coating thicknesses.

32. A fiber assembly, comprising:
   a first optical fiber defining a first optical path length, the first optical fiber including first, second, and third segments;
   a second optical fiber defining a second optical path length, the second optical fiber including first, second, and third segments, wherein the first optical path length is different than the second optical path length, wherein each of the first and second optical fibers defines a respective optical path length and the combination of the first optical fiber and the second optical fiber defines a thermally compensated optical path difference;
   an optical beam divider situated to couple a first beam portion and a second beam portion of an optical beam to the first segment of the first optical fiber and the first segment of the second optical fiber, respectively;
   a first optical rotator coupled to the first, second, and third segments of the first optical fiber so the first beam portion is coupled from the first segment of the first optical fiber to the second segment of the first optical fiber, and a returned beam portion associated with the first beam portion is coupled from the second segment of the first optical fiber to the third segment of the first optical fiber; and
   a second optical rotator coupled to the first, second, and third segments of the second optical fiber so the second beam portion is coupled from the first segment of the second optical fiber to the second segment of the second optical fiber, and a returned beam portion associated with the first beam portion is coupled from the second segment of the second optical fiber to the third segment of the second optical fiber, wherein the first optical fiber has a first length and a first buffer coating extends along the first length and the second optical fiber has a second length and a second buffer coating that is different from the first buffer coating extends along the second length, and the first and second effective thermal path coefficients are based at least in part on the first and second buffer coatings.

33. The fiber assembly of claim 32, wherein the thermally compensated optical path difference is based on the second segment of the first optical fiber and the second segment of the second optical fiber.

34. The fiber assembly of claim 32, wherein the thermally compensated optical path difference is based on at least two of the first, second, and third segments of each of the first optical fiber and the second optical fiber.

* * * * *